US010719364B2

(12) United States Patent
Martin et al.

(10) Patent No.: US 10,719,364 B2
(45) Date of Patent: Jul. 21, 2020

(54) QUANTIFYING USAGE OF DISPARATE COMPUTING RESOURCES AS A SINGLE UNIT OF MEASURE

(71) Applicant: Carolina Cloud Exchange Inc., Huntersville, NC (US)

(72) Inventors: Timothy A. Martin, Huntersville, NC (US); Myron L. Stewart, Harrisburg, NC (US)

(73) Assignee: Carolina Cloud Exchange Inc., Huntersville, NC (US)

( * ) Notice: Subject to any disclaimer, the term of this patent is extended or adjusted under 35 U.S.C. 154(b) by 0 days.

(21) Appl. No.: 16/362,333

(22) Filed: Mar. 22, 2019

(65) Prior Publication Data

US 2019/0294473 A1    Sep. 26, 2019

Related U.S. Application Data

(60) Provisional application No. 62/647,335, filed on Mar. 23, 2018, provisional application No. 62/690,533, filed on Jun. 27, 2018.

(51) Int. Cl.
| | |
|---|---|
| *G06F 9/46* | (2006.01) |
| *G06F 9/50* | (2006.01) |
| *G06F 11/30* | (2006.01) |
| *G06F 11/34* | (2006.01) |
| *H04L 29/08* | (2006.01) |

(52) U.S. Cl.
CPC ........ *G06F 9/5027* (2013.01); *G06F 11/3006* (2013.01); *G06F 11/3495* (2013.01); *H04L 67/10* (2013.01)

(58) Field of Classification Search
CPC . G06F 9/5077; G06F 11/3006; G06F 11/3495
See application file for complete search history.

(56) References Cited

U.S. PATENT DOCUMENTS

| | | | |
|---|---|---|---|
| 7,444,307 B2 | 10/2008 | Heires et al. | |
| 8,024,239 B2 | 9/2011 | Shirazi | |
| 8,316,101 B2* | 11/2012 | Ammerlaan | ............ G06F 9/505 |
| | | | 705/39 |
| 8,756,302 B2 | 6/2014 | Cowan et al. | |
| 2009/0144568 A1 | 6/2009 | Fung | |
| 2009/0234941 A1* | 9/2009 | Ammerlaan | ............ G06F 9/505 |
| | | | 709/224 |
| 2011/0010662 A1 | 1/2011 | Zhang et al. | |
| | | (Continued) | |

OTHER PUBLICATIONS

International Search Report and Written Opinion dated Jun. 11, 2019, issued in PCT Patent Application No. PCT/US2019/023712, 11 pages.

*Primary Examiner* — Camquy Truong
(74) *Attorney, Agent, or Firm* — Troutman Sanders LLP; Ryan A. Schneider; Christopher C. Close, Jr.

(57) ABSTRACT

A method for quantifying resource usage may include measuring a quantity of a plurality of physical computing resources being used over a period of time. The method may also include normalizing each measured quantity of each physical computing resource being used. The method may also include summing the normalized measured quantities of the physical computing resources being used to generate a single usage value representative of the physical computing resources being used over the period of time.

12 Claims, 10 Drawing Sheets

(56) References Cited

U.S. PATENT DOCUMENTS

| | | |
|---|---|---|
| 2012/0023429 A1 | 1/2012 | Medhi |
| 2012/0110460 A1 | 5/2012 | Wilson |
| 2012/0311600 A1* | 12/2012 | Takemura ............... G06F 9/505 |
| | | 718/104 |
| 2013/0031028 A1 | 1/2013 | Martin |
| 2013/0297529 A1 | 11/2013 | Shirazi |
| 2014/0075380 A1 | 3/2014 | Milirud et al. |
| 2019/0045185 A1* | 2/2019 | Fu ........................ H04N 19/117 |

* cited by examiner

QUANTIFYING USAGE OF DISPARATE COMPUTING RESOURCES AS A SINGLE UNIT OF MEASURE

CROSS-REFERENCE TO RELATED APPLICATIONS

The present application claims the benefit of U.S. Provisional Application Ser. No. 62/647,335, filed on Mar. 23, 2018, entitled Quantifying Usage of Disparate Computing Resources as a Single Unit of Measure and U.S. Provisional Application Ser. No. 62/690,533, filed on Jun. 27, 2018, entitled Quantifying Usage of Disparate Computing Resources as a Single Unit of Measure, both of which are fully incorporated herein by reference.

TECHNICAL FIELD

The present disclosure is generally related to computing and more particularly to metering usage of disparate computer resources and quantifying the usage as a single unit of measure.

BACKGROUND

Cloud computing allows a user (e.g., an individual or an organization) to rent computing resources that are maintained and/or managed by a third-party. This may allow the user to rent computing resources that are tailored to their individual computing needs without necessarily having to make a substantial investment in physical hardware, data center real estate, electricity, data center personnel, and/or software licenses.

An example cloud computing system may include physical resources (e.g., a processor and memory) and/or virtualized resources (e.g., a virtualized processor and virtualized memory). A user accessing the cloud computing system may rent a quantity of resources capable of running their workloads. The quantity of computing resources rented may be estimated based on theoretical maximum workloads. The theoretical maximum workloads are assumed to use nearly all (e.g., approximately 100%) of the available resources. In other words, users will rent the maximum quantity of resources needed to execute their workloads in order to avoid system performance issues due to a surge in resource requirements. However, surges in usage may occur infrequently and resources used on average may be below the theoretical maximum, which leads to waste (e.g., the renting of unused computing resources).

Cloud computing providers may implement pricing models based on a quantity of resources rented (e.g., for a predetermined time) as opposed to an actual quantity of resources used (or consumed) by the user. These resources may be packaged as servers with a preconfigured central processing unit (CPU), memory (e.g., random access memory), storage, graphics processing units (GPU), dedicated networking capabilities (e.g., to provide a predetermined networking speed), field programmable gate arrays (FPGA), and/or any other computing resource. The packaged servers may generally be referred to as an instance which a user can rent for a period of time (e.g., in intervals of second(s), minute(s), hour(s), day(s), week(s), month(s), year(s), and/or any other interval of time). Therefore, a user may rent an instance based on the maximum computing resources they estimate using (e.g., which may be estimated based on the surges in usage). By renting resources in instances, a user may only use a portion of the computing resources for a majority of the term of the rental agreement. In other words, this may result in the user paying for resources that are not consumed and the cloud computing provider may financially benefit due to the renting of unused resources.

BRIEF DESCRIPTION OF THE DRAWINGS

These and other features and advantages will be better understood by reading the following detailed description, taken together with the drawings, wherein.

DETAILED DESCRIPTION

A system, method, and apparatus for measuring physical resource usage in computing and quantifying the usage as a single unit of measure is generally disclosed herein. For example, disparate computing resources may be measured, normalized (e.g., converted) to a common unit of measure, and each of the normalized measurements may be summed such that the total usage may be represented as a single value. By representing disparate computing resources as a single unit, resource usage (or consumption) can be monitored in real-time, workloads can be optimized to improve usage of available resources, and/or waste can be reduced.

By measuring physical resources (as opposed to virtual resources) a more accurate measure of actual usage may be obtained. For example, due to a technique used known as ballooning, measuring usage based on virtual resources may overestimate the actual usage of physical resources. In other words, when measuring only virtual resources, the virtual resources may indicate that more resources are being consumed (or used) by a workload than what the workload is actually consuming in physical resources. In some cases, the quantity of virtual resources indicated as being consumed may exceed the physical resources available.

A graphics processing unit (GPU), as used herein, may generally refer to a computing resource that includes at least a graphics processor and/or graphics memory and, in some cases, the GPU may generally be referred to as a graphics processing system (GPS).

Figure 1:
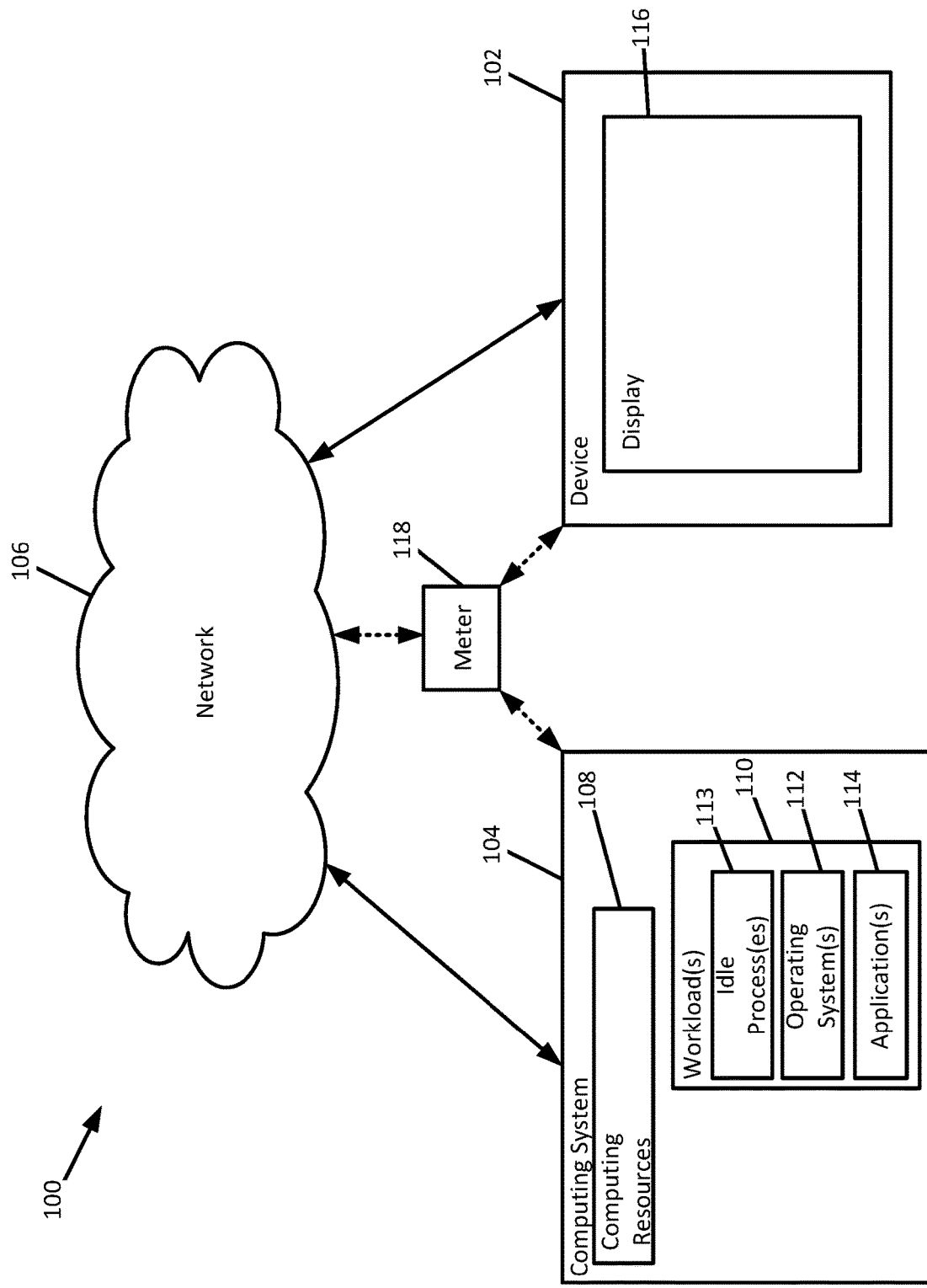
FIG. 1 shows a schematic example of a computing network, consistent with embodiments of the present disclosure.

FIG. 1 shows a schematic example of a computing network 100. As shown, the computing network 100 may include a device 102 and a computing system 104, each being communicatively coupled to a network 106 (e.g., the internet). The computing system 104 may include physical computing resources 108 configured to execute one or more workloads 110. The one or more workloads 110 may include, for example, one or more of one or more operating systems 112, one or more applications 114, and/or one or more idle processes 113. The idle processes 113 may be background processes related to the operation of the computing system 104 (e.g., as a result of the operation of hardware of the computing system 104) and may consume at least a portion of the physical computing resources 108 even though a request from, for example, the device 102 to execute the application 114 and/or the operating system 112 has not been received. In other words, even when the computing system 104 is idle, the computing system 104 is still consuming at least a portion of the physical computing resources 108 due to the operation of the physical hardware of a computing system 104 when powered on.

One or more of the workloads 110 may be caused to be executed in response to a request generated by the device 102 (e.g., the operating system(s) 112 and/or the application(s) 114). For example, the device 102 may request the execution of one or more applications 114 by communicating the request to the computing system 104 through the network 106. When the request is received, the computing system 104 may allocate at least a portion of the physical computing resources 108 to the execution of the application 114. In response to the application 114 being executed, the computing system 104 may transmit data back to the device 102. For example, the data transmitted back to the device 102 may be used to generate a graphical user interface on a display 116 of the device 102. A user of the device 102 may then interact with the graphical user interface and cause the device 102 to transmit additional instructions to the computing system 104 that cause different portions of the application 114 to be executed on the computing system 104.

As shown, a meter 118 may be provided. The meter 118 may include any combination of hardware, software, and/or firmware configured to measure the usage of the physical computing resources 108 used by the workloads 110 (e.g., the idle processes 113, the operating system(s) 112, and/or the application(s) 114) over a period of time (e.g., a predetermined or non-predetermined period of time). For example, the meter 118 may be implemented as software configured to be stored on one or more memories (e.g., any type of tangible, non-transitory storage medium, and may include any one or more of a magnetic recording medium (e.g., a hard disk drive), optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media for storing electronic instructions) and executed by one or more processors (e.g., processors offered for sale by INTEL, ADVANCED MICRO DEVICES, IBM, ARM, ORACLE, and/or any other processor) to cause one or more operations to be carried out. By way of further example, the meter 118 may be implemented as circuitry (e.g., an application-specific integrated circuit).

The usage of the physical computing resources 108 may be measured using a host operating system (e.g., an operating system written in an assembly language) and/or a hypervisor executing on the computing system 104. For example, the meter 118 may include a plugin database having one or more plugins configured to enable measuring of resource usage of the host operating system via a hypervisor executing on the computing system 104. By way of further example, the meter 118 may be configured to measure resource usage directly from the physical computing resources 108 (e.g., using a host operating system). In some cases, the meter 118 may measure the physical computing resource usage across multiple different computing systems 104.

The meter 118 measures usage of the physical computing resources 108, normalizes each of the physical computing resources 108 to a common unit of measure, and combines normalized computing resources such that the combined (e.g., total) usage can be represented as a single unit. In other words, the meter 118 may be generally described as quantifying the usage of multiple disparate computing resources as a single value representative of the usage of the computing resources 108. For example, the meter 118 may be configured to measure the usage of multiple disparate computing resources over a period of time and generate a single usage value representative of the usage over the period of time.

In order to mitigate and/or otherwise prevent the effects of ballooning, the meter 118 measures the physical resource usage as opposed to, for example, virtual resource usage. As such, a physical resource usage of, for example, a virtual machine can be measured more accurately. In some cases, the meter 118 may also be configured to measure a maximum quantity of the physical computing resources 108 available to be used (e.g., used and inactive resources), normalize the measured quantity of each physical resource of the physical computing resources 108 to a common unit of measure, and then sum the normalized resources to obtain a maximum quantity of physical resources available represented as a single unit. By measuring a maximum quantity of resources available, a user may be able to optimize the quantity of physical computing resources 108 for executing the workload 110. Additionally, or alternatively, the meter 118 may be configured to measure a minimum quantity of the physical computing resources 108 required for running the computing system 104 (e.g., only the resources used by the idle processes 113), normalize the measured quantity of each physical resource of the physical computing resources 108 to a common unit of measure, and then sum the normalized resources to obtain a single unit representative of a minimum quantity of physical resources required to be used (e.g., when the computing system 104 is operating but not executing one or more operating systems 112 and/or applications 114).

In some cases, the meter 118 may be configured to measure the usage of physical resources over a period of time (e.g., a billing period for the resource usage, a contractual term, an hour, a day, a week, and/or any other period of time) and generate a single usage value representative of the usage of the physical resources over the period of time. The measured usage may then be utilized to determine the appropriate quantity of resources to purchase for a period of time and/or be used to generate a bill based on actual usage. As a result, the resource consuming user may reduce the quantity of resources purchased and the resource provider may reduce the total quantity of resources offered for sale and/or allocate the unused resources to another user.

In some cases, the meter 118 may be configured to enable and/or disable the device's 102 access to the computing resources 108 of the computing system 104. In other words, the meter 118 may be configured to selectively communicatively couple and/or decouple the device 102 to the computing system 104. For example, the meter 118 may disable access, by the device 102, to at least a portion of the computing resources 108 after expiration of a period of time (e.g., the lapsing of a contractual term), failure to satisfy a contractual term (e.g., failure to pay a bill, misuse of computing resources, and/or the like), and/or in response to resource usage, as measured over a period of time, exceeding or failing to exceed a predetermined quantity (or threshold). By way of further example, the meter 118 may enable access to the computing resources 108 at a predetermined time (e.g., when a contractual term begins).

In some cases, the meter 118 may be configured to selectively enable and disable access to at least a portion of the computing resources 108 based on availability. For example, the device 102 may have access to at least a portion of the computing resources 108 when another user is not using the computing resources 108. However, when another user requests access to the computing resources 108, a recall request may be transmitted to the meter 118 that causes the meter 118 to disable access, by the device 102, to at least a portion of the computing resources 108 such that the other user can access the computing resources 108. As a result, the meter 118 may generally be described as being configured to reduce a quantity of the computing resources 108 that are not being used to, for example, execute one or more applications 114 or operating systems 112.

As shown, the meter 118 may be communicatively coupled to the device 102, the computing system 104, and/or the network 106. In some cases, at least a portion of the meter 118 may be included in the device 102 and/or the computing system 104. Additionally, or alternatively, at least a portion of the meter 118 may be included in a third-party device communicatively coupled to one or more of the device 102 and/or the computing system 104 (e.g., using the network 106).

The device 102 may include, any one or more of, a personal computer, a tablet computer, a cellphone, a smart phone, a smart watch, a smart television, a fitness tracker, a smart scale (for weighing an object), a smart thermostat, a smart security monitoring system (e.g., indoor and/or outdoor camera system, doorbell, alarm system, lock system, lighting system, and/or any other smart security monitoring system), a smart display (e.g., a display configured to communicate with the network 106), smart healthcare systems (e.g., ultrasound systems, molecular imaging systems, computerized tomography scan systems, x-ray systems, and/or any other smart healthcare systems), remote health monitoring devices, gaming devices (e.g., gaming consoles, hand-held gaming devices, virtual reality headsets, and/or any other gaming device), Internet of Things devices (e.g., autonomous vehicles, connected home appliances, drones, robots, and/or any other Internet of Things device), a server, and/or any other device capable of communicating with the computing system 104.

Figure 2A:
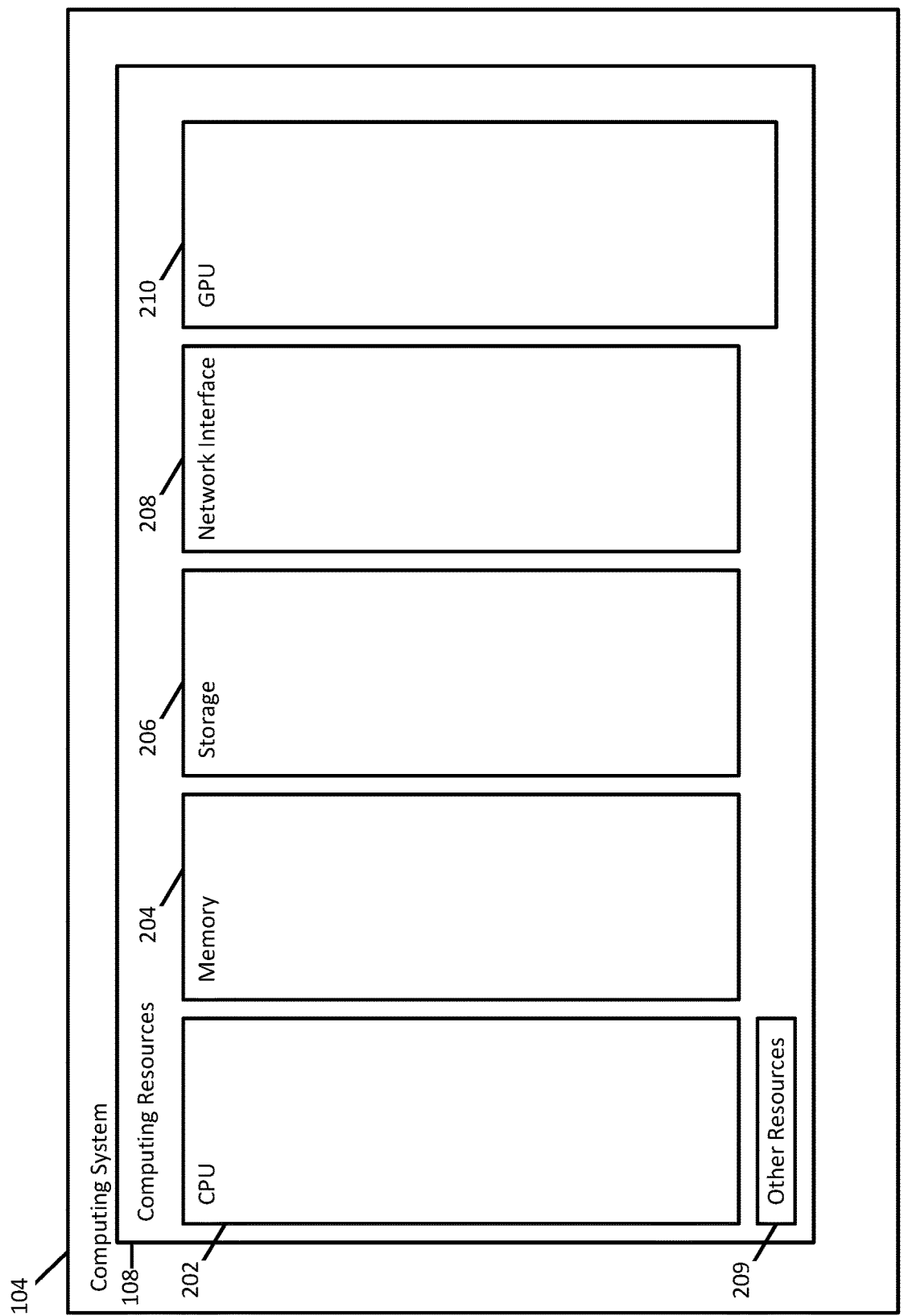
FIG. 2A shows a schematic example of a computing system capable of being used in the computing network of FIG. 1, consistent with embodiments of the present disclosure.

FIG. 2A shows a schematic example of the computing system 104 of FIG. 1. As shown, the physical computing resources 108 of the computing system 104 may include a central processing unit (CPU) 202, memory 204, storage 206, a network interface 208, and a graphics processing unit (GPU) 210. Each of the CPU 202, the memory 204, the storage 206, the network interface 208, and the GPU 210 have one or more metrics/attributes associated therewith.

Additionally, or alternatively, the computing resources 108 may include other resources 209. The other resources 209 may include, for example, any one or more of a Field Programmable Gate Array (FPGA), a Tensor Processing Unit (TPU), an Intelligence Processing Unit (IPU), a Neural Processing Unit (NPU), a Vision Processing Unit (VPU), a Digital Signal Processor (DSP), an Accelerated Processing Unit (APU), an Application-Specific Integrated Circuit (ASIC), a System-on-Chip (SoC), a programmable SoC, an Application Specific Standard Parts (ASSP), an Adaptive Compute Acceleration Platform (ACAP), a microcontroller, and/or any other computing resource.

Figure 2B:
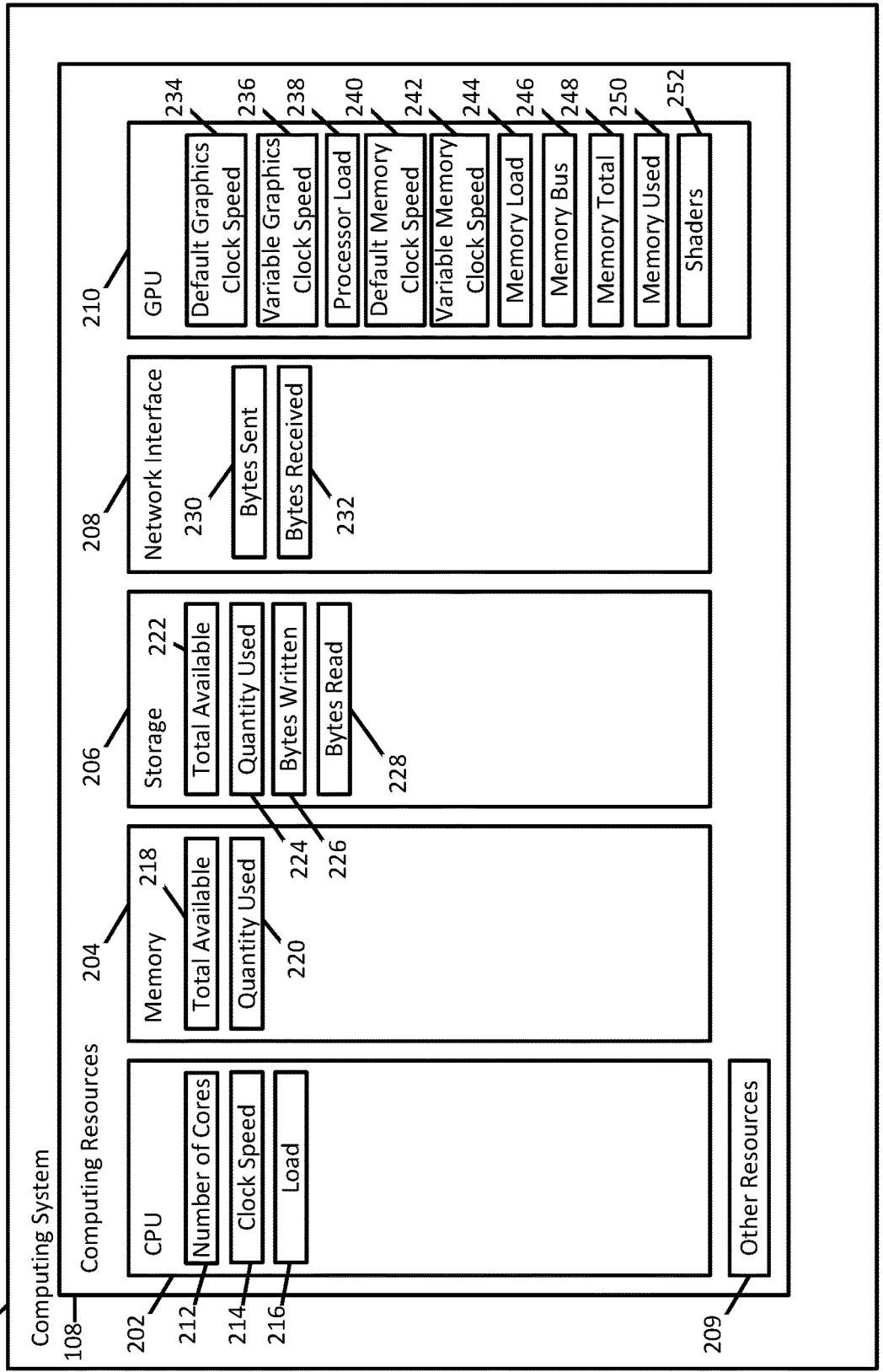
FIG. 2B shows a schematic example of the computing system of FIG. 2A, consistent with embodiments of the present disclosure.

As shown in FIG. 2B, the CPU 202 may be associated with metrics/attributes for a number of processing cores 212, a processor clock speed 214, and/or a processor load 216. The number of processing cores 212 indicates the number independent processing units (or cores) that are available to the CPU 202. The processor clock speed 214 indicates the default clock speed for each of the cores of the CPU 202. The processor load 216 indicates an amount of computation work being carried out by the CPU 202. The CPU 202 may be any computer processor, including, for example, single and/or multicore processors capable of executing computer instructions. Examples of the CPU 202 may include processors offered for sale by INTEL, ADVANCED MICRO DEVICES, IBM, ARM, ORACLE, and/or any other processor.

The memory 204 may be associated with metrics/attributes for a total quantity of memory available 218 and/or a quantity of memory used 220. The memory 204 may be tangible, non-transitory, memory. The memory 204 may be volatile memory. For example, memory 204 may be random access memory (RAM). Examples of RAM may include, for example, static RAM (SRAM), dynamic RAM (DRAM), fast page mode DRAM (FPM DRAM), extended data out DRAM (EDO DRAM), synchronous dynamic RAM (SDRAM), double data rate SDRAM (DDR SDRAM), RAMBUS dynamic RAM (RDRAM), and/or any other form of RAM.

The storage 206 may be associated with metrics/attributes for a total quantity of storage available 222, a total quantity of storage used 224, a number of bytes written 226 to storage 206, and/or a number of bytes read 228 from storage 206. The storage 206 may be non-volatile memory. For example, the storage 206 may include any type of tangible, non-transitory storage medium, and may include any one or more of a magnetic recording medium (e.g., a hard disk drive), optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media for storing electronic instructions.

The network interface 208 may be associated with metrics/attributes for a number of bytes sent 230 and/or a number of bytes received 232. The network interface 208 may be configured to communicatively couple to the network 106 (FIG. 1). For example, the network interface 208 may be a network interface controller configured to communicatively couple to one or more of an Ethernet network, a wireless network, a fibre channel network, a fiber distributed data interface (FDDI) network, a copper distributed data interface (CDDI) network, and/or any other network.

The GPU 210 may be associated with metrics/attributes for a graphics processor default clock speed 234, a graphics processor variable clock speed 236, a graphics processor load 238, a graphics memory default clock speed 240, a variable graphics memory clock speed 242, a graphics memory load 244, a graphics memory bus 246, a total quantity of graphics memory available 248, a quantity of graphics memory used 250, and/or a quantity of shaders 252. The graphics processor default clock speed 234 indicates the default clock speed for the processor of the GPU 210 and the graphics processor variable clock speed 236 indicates variable clock speed of the graphics processor. In some cases, the graphics processor variable clock speed 236 may exceed the clock speed of the graphics processor default clock speed 234. In other cases, the graphics processor variable clock speed 236 may not exceed the graphics processor default clock speed 234. Similarly, the graphics memory default clock speed 240 indicates the default clock speed of the graphics memory and the variable graphics memory clock speed 242 indicates the clock speed at which the graphics memory is actually running. In some cases, the variable graphics memory clock speed 242 may measure greater than the graphics memory default clock speed 240. In other cases, the variable graphics memory clock speed 242 may measure less than (or equal to) the graphics memory default clock speed 240. The graphics memory load 244 indicates a quantity of read and/or write operations being carried out on the GPU memory. The graphics memory bus 246 indicates a bus size of the GPU 210.

The GPU 210 may include integrated and/or dedicated GPUs. For example, the GPU may include any of the GPUs made by, for example, INTEL, NVIDIA, ADVANCED MICRO DEVICES, and/or any other GPU. When the GPU 210 includes an integrated GPU, the metrics/attributes may be based, at least in part, on the shared resources of the integrated GPU.

While CPU 202, memory 204, storage 206, network interface 208, and GPU 210 may be referred to singularly, it should be understood that the computing system 104 may include multiple physical CPUs, memories, storages, network interfaces, and GPUs, one or more of which may be configured to cooperate to, for example, improve the performance of the computing system 104. Similarly, in cases where the computing system 104 includes one or more of the other resources 209, there may be one or more of each of the other resources 209.

Figure 3A:
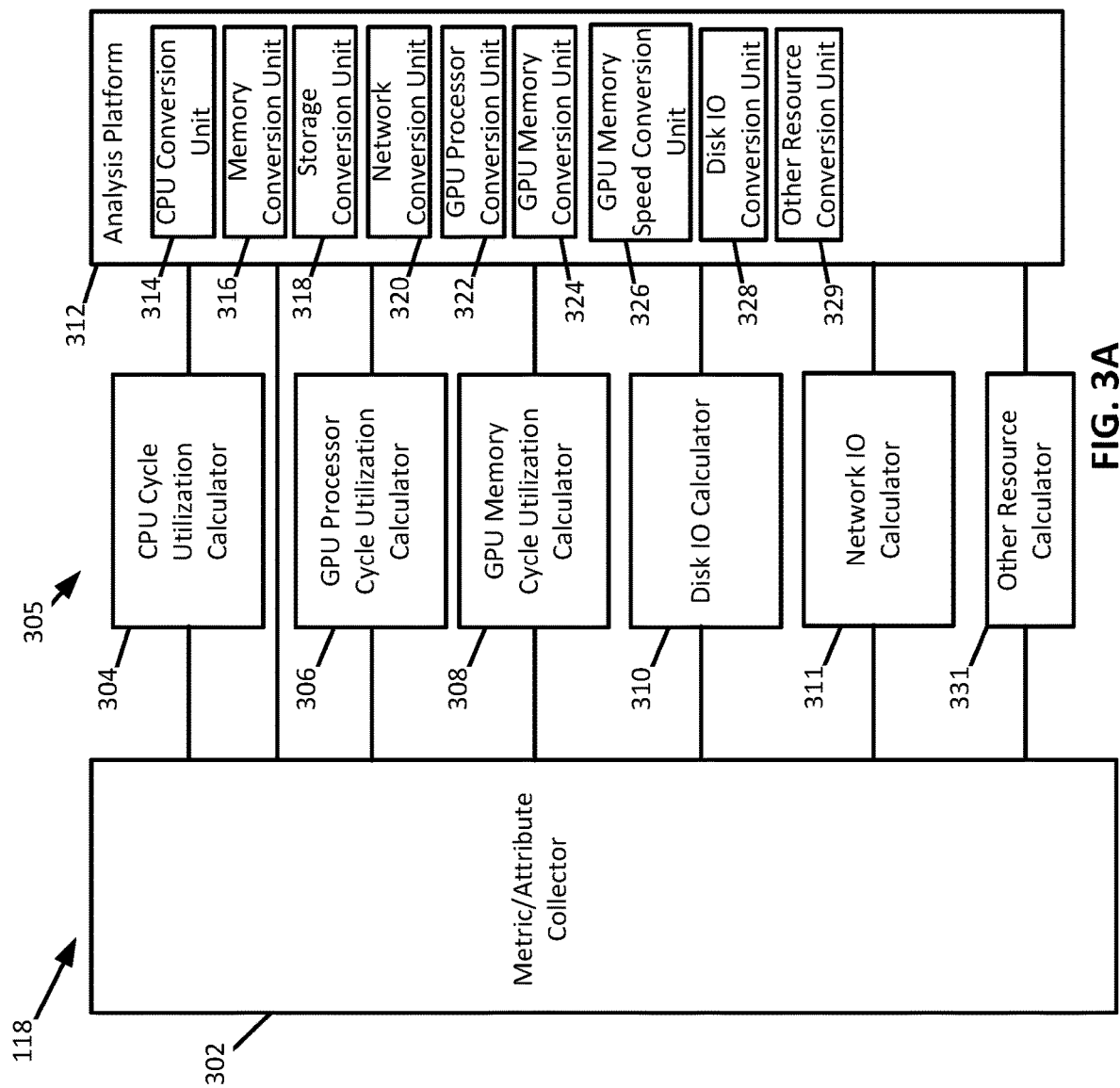
FIG. 3A shows a schematic example of a meter for measuring usage of computing resources capable of being used in the computing system of FIG. 2, consistent with embodiments of the present disclosure.

FIG. 3A shows a schematic example of the meter 118 of FIG. 1. As shown, the meter 118 may include a metric/attribute collector 302 communicatively coupled to the physical computing resources 108 (FIG. 2), calculators 305, and an analysis platform 312. Each of the metric/attribute collector 302, the calculators 305, and/or the analysis platform 312 may be distributed across different computing systems (or environments). In some cases, one or more of the metric/attribute collector 302, the calculators 305, and/or the analysis platform 312 may be located on the same computing system. For example, one or more of the metric/attribute collector 302, the calculators 305, and/or the analysis platform 312 may be located on the device 102. By way of further example, one or more of the metric/attribute collector 302, the calculators 305, and/or the analysis platform 312 may be located on a separate device communicatively coupled to the network 106 and/or the computing system 104. By way of still further example, one or more of the metric/attribute collector 302, the calculators 305, and/or the analysis platform 312 may be located on the computing system 104.

The metric/attribute collector 302 requests one or more metrics/attributes from one or more of the CPU 202, the memory 204, the storage 206, the network interface 208, the GPU 210, and/or one or more of the other resources 209. For example, the metric/attribute collector 302 can request one or more metrics/attributes from a hypervisor (e.g., using a plugin) executing on one or more of the CPU 202, the memory 204, the storage 206, the network interface 208, the GPU 210, and/or one or more of the other resources 209. By way of further example, the metric/attribute collector 302 can request one or more metrics/attributes from a host operating system (e.g., an operating system written in an assembly language) executing on one or more of the CPU 202, the memory 204, the storage 206, the network interface 208, the GPU 210, and/or one or more of the other resources 209.

When the metric/attribute collector 302 requests one or more metrics/attributes from the CPU 202, the requested metrics/attributes may be input into a CPU cycle utilization calculator 304. The CPU cycle utilization calculator 304 may generate a metric/attribute corresponding to a quantity of CPU cycles being utilized based, at least in part, on the requested metrics/attributes from the CPU 202. For example, the CPU cycle utilization calculator 304 may generate a CPU cycle utilization based, at least in part, on the number of processing cores 212, the processor clock speed 214, and the processor load 216. In these cases, the CPU cycle utilization calculator 304 may generate the CPU cycles being utilized according to the following equation:

$$\frac{(\text{processor clock speed})(\text{number of processing cores})}{100} * \quad [\text{EQ 1}]$$
$$(\text{processor load})$$

When the metric/attribute collector 302 requests one or more metrics/attributes from the GPU 210, the requested metrics/attributes may be input into one or more of a GPU processor cycle utilization calculator 306 and/or a GPU memory cycle utilization calculator 308. The GPU processor cycle utilization calculator 306 and the GPU memory cycle utilization calculator 308 may generate a metric/attribute corresponding to a GPU processor cycle utilization and a GPU memory cycle utilization, respectively, based, at least in part, on the requested metrics from the GPU 210.

For example, the GPU processor cycle utilization calculator 306 may generate a GPU processor cycle utilization based, at least in part, on the graphics processor variable clock speed 236 and the graphics processor load 238. In these cases, the GPU processor cycle utilization calculator 306 may generate the GPU processor cycles utilized according to the following equation:

$$\frac{(\text{graphics processor variable clock speed})}{100} * \quad [\text{EQ 2}]$$
$$(\text{graphics processor load})$$

By way of further example, the GPU memory cycle utilization calculator 308 may generate a GPU cycle utilization based, at least in part, on the variable graphics memory clock speed 242 and the graphics memory load 244.

In these cases, the GPU memory cycle utilization calculator 308 may generate the clock cycles of GPU memory consumed according to the following equation:

$$\frac{(\text{variable graphics memory clock speed})}{100} * \quad [\text{EQ 3}]$$
$$(\text{graphics memory load})$$

When the metric/attribute collector 302 requests one or more metrics/attributes from the storage 206, the metrics/attributes may be input into a disk IO calculator 310. The disk IO calculator 310 may generate a metric/attribute corresponding to a total number of bits read and written to the storage 206 over a period of time (e.g., one second). Therefore, in some cases, the disk IO calculator 310 may add the number of bytes written 226 and the number of bytes read 228 over the period of time to generate the metric/attribute corresponding to disk IO. In cases where the period of time is greater than one second, the number of bytes written 226 and the number of bytes read 228 may be divided by the total number of seconds. In cases where the period of time is less than one second, the number of bytes written 226 and the number of bytes read 228 may be divided by the fraction of a second.

When the metric/attribute collector 302 requests one or more metrics/attributes from the network interface 208, the metrics/attributes may be input into a network IO calculator 311. The network IO calculator 311 may generate a metric/attribute corresponding to a total number of bits transmitted or received by the network interface 208 over a period of time (e.g., one second). Therefore, in some cases, the network IO calculator 311 may add the number of bytes sent 230 and the number of bytes received 232 over the period of time to generate the metric/attribute corresponding to network IO. In cases where the period of time is greater than one second, the number of bytes sent 230 and the number of bytes received 232 may be divided by the total number of seconds. In cases where the period of time is less than one second, the number of bytes sent 230 and the number of bytes received 232 may be divided by the fraction of a second.

As shown, the analysis platform 312 may receive one or more of the metrics/attributes associated with the physical computing resources 108 including, for example, one or more metrics/attributes output from one or more of the calculators 305. In some cases, the analysis platform 312 may include one or more other resources calculators 331 that correspond to a respective one or more of the other resources 209. The one or more metrics/attributes output from one or more of the calculators 305 may include, for example, one or more of the CPU cycle utilization (e.g., as output from the CPU cycle utilization calculator 304), the GPU processor cycle utilization (e.g., as output by the GPU processor cycle utilization calculator 306), the GPU memory cycle utilization (e.g., as output by the GPU memory cycle utilization calculator 308), the disk IO (e.g., as output by the disk IO calculator 310), and/or network IO (e.g., as output by the network IO calculator 311). The analysis platform 312 may convert the received metrics/attributes using one or more conversion units. In some cases, each metric/attribute has a corresponding conversion unit. For example, the analysis platform 312 may utilize a CPU conversion unit 314, a memory conversion unit 316, a storage conversion unit 318, a network conversion unit 320, a GPU processor conversion unit 322, a GPU memory conversion unit 324, a GPU memory speed conversion unit 326, a disk IO conversion unit 328, and/or any other conversion unit corresponding to a computing resource (e.g., a conversion unit for one or more of the other resources 209 such as FPGA resources, ASIC resources, SoC resources, DSP resources, microcontroller resources, ACAP resources, and/or the like).

The analysis platform 312 may convert the disparate computing resources into a normalized unit by dividing the usage of each physical resource (e.g., CPU 202, memory 204, storage 206, network interface 208, and GPU 210) by a respective conversion unit corresponding to the physical resource (e.g., the CPU conversion unit 314, the memory conversion unit 316, the storage conversion unit 318, the network conversion unit 320, the GPU processor conversion unit 322, the GPU memory conversion unit 324, the GPU memory speed conversion unit 326, and the disk IO conversion unit 328) to obtain a respective normalized usage for each physical resource. In some cases, the analysis platform 312 can be configured to convert one or more of the other resources 209 to a standardized unit. For example, the analysis platform 312 may include an other resource conversion unit 329.

The normalized usages can then be summed to obtain a total usage value. Additionally, or alternatively, as should be readily understood in view of the disclosure herein, in some cases, the normalized usages can be summed according to a computing resource type (e.g., the CPU 202, the memory 204, the storage 206, the network interface 208, the GPU 210, and/or one or more of the other resources 209) to obtain a normalized usage value for a specific resource. For example, a normalized usage of the physical resources of the GPU 210 (e.g., GPU processor and/or GPU memory) can be summed to generate a total GPU usage. Other examples for normalized usage of specific physical resources may include a total FPGA usage, a total ASIC usage, a total DSP Usage, a total SoC usage, a total microcontroller usage, a total ACAP usage, a total TPU usage, and/or any other total usage corresponding to a respective resource.

Figure 3B:
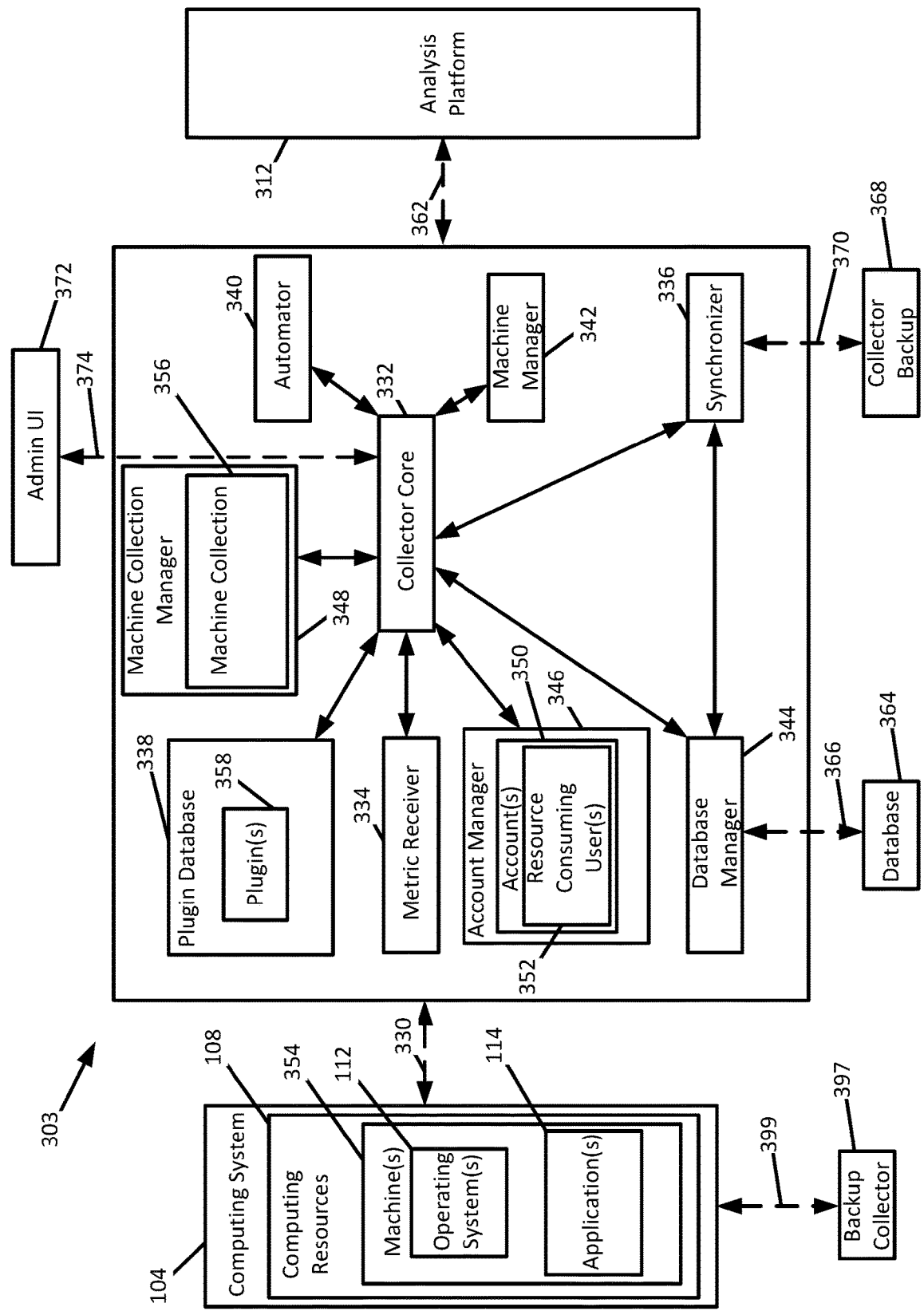
FIG. 3B shows a schematic example of a metric/attribute collector capable of being used with the meter of FIG. 3A, consistent with embodiments of the present disclosure.

FIG. 3B shows a metric/attribute collector 303, which may be an example of the metric/attribute collector 302, that is configured to monitor resource usage of multiple (e.g., a plurality of) different users and associate each user's usage with a respective user. In other words, the metric/attribute collector 303 is configured to receive metrics corresponding to resource usage. The metric/attribute collector 303 may include any combination of hardware, software, and/or firmware.

The metric/attribute collector 303 may be configured to be included with any one or more of the computing system 104, the device 102, and/or any other device communicatively coupled to the network 106. For example, the device 102 may include the metric/attribute collector 303. When the device 102 includes the metric/attribute collector 303, a user of the metric/attribute collector 303 may be able to utilize the meter 118 with fewer modifications to the user's network security, when compared to when the metric/attribute collector 303 is not executed on the device 102.

As shown, the metric/attribute collector 303 is communicatively coupled to the computing system 104 via a communication link 330. The communication link 330 may transmit data (e.g., metrics/attributes associated with the computing resources 108) to the metric/attribute collector 303. Data transmitted over the communication link 330 may be encrypted to prevent unauthorized access to the data. As shown, the metric/attribute collector 303 may be remote from the computing system 104 (e.g., operating on a different server, in a different network, and/or on a different device). However, in some cases, the metric/attribute collector 303 may be local to the computing system 104 (e.g., operating on the same server, on the same network, and/or on the same device).

The metric/attribute collector 303 may also be configured to communicate with the analysis platform 312 over a communication link 362. Data transmitted over the communication link 362 may be encrypted to prevent unauthorized access to the data. In some cases, the metric/attribute collector 303 may include the analysis platform 312. As such, the metric/attribute collector 303 may not transmit data over the communication link 362.

The analysis platform 312 may generate the total resource usage value represented as a single normalized unit. As shown, the analysis platform 312 may be remote from the metric/attribute collector 303 (e.g., operating on a different server, in a different network, and/or on a different device). However, in some cases, the analysis platform 312 may be local to the metric/attribute collector 303 (e.g., operating on the same server, on the same network, and/or on the same device).

As shown, the metric/attribute collector 303 may include at least one collector core 332, at least one collector metric receiver 334, at least one collector synchronizer 336, at least one plugin database 338, at least one collector automator 340, at least one machine manager 342, at least one collector database manager 344, at least one account manager 346, and at least one machine collection manager 348. The collector core 332 communicates with and/or manages each of the collector metric receiver 334, the collector synchronizer 336, the plugin database 338, the collector automator 340, the machine manager 342, the collector database manager 344, the account manager 346, and the machine collection manager 348.

The collector metric receiver 334 is configured to receive metrics/attributes representative of the usage of the computing resources 108 of one or more users and/or workloads. In some cases, the collector metric receiver 334 may include one or more of the calculators 305.

At least a portion of the resource usage may be associated with one or more users. For example, at least a portion of the resource usage may be associated with one or more accounts 350 using the account manager 346. The account 350 may be associated with one or more resource consuming users 352. As a result, the resource usage of multiple accounts 350 and/or resource consuming users 352 may be simultaneously monitored. For example, a corporate entity may have an account 350 with which its employees (e.g., resource consuming users 352) are associated. As a result, as the employees access the computing resources 108, the usage is associated with the account 350 that corresponds to the corporate entity. By associating the usage with the accounts 350 a single metric/attribute collector 303 may be used to monitor multiple accounts 350, which may reduce resources consumed when compared to associating a metric/attribute collector 303 with each account 350 and/or resource consuming user 352.

The account 350 may be associated with one or more machines 354 (e.g., virtual or physical) that are accessible to the resource consuming users 352 and operate using the computing resources 108. The machines 354 may include, for example, one or more of the operating system(s) 112 and/or the application(s) 114. For example, a machine 354 may be configured to execute a LINUX based operating system, a WINDOWS based operating system, a MAC based operating system, and/or any other operating system in a virtualized or physical environment. In some cases, a machine 354 may be configured to execute one or workloads 110 (e.g., application(s) 114) without the execution of a guest operating system. For example, a machine 354 may be configured to execute one or more applications 114 directly on the physical machine without any form of virtualization or execute a container and the one or more applications 114 may be configured to execute within the container. Therefore, a container may generally be described as an isolated environment configured to execute on one or more kernels of the machine 354. A container may be executed on a physical or virtual machine.

The machine collection manager 348 allows for a plurality of machines 354 to be associated with at least one machine collection 356. The machine collection manager 348 may also allow for a plurality of containers or uniquely identified (e.g., tagged) workloads to be associated with at least one collection. In some cases, multiple machine collections 356 may be associated with a respective account 350. For example, an owner (or authorized user) of a respective account 350 may add one or more machines 354 to a respective machine collection 356. Each machine collection 356 may include a plurality of machines 354, each configured to execute, for example, a different operating system 112 and/or application 114 (e.g., the application 114 may be executed using a container).

The plugin database 338 can be configured to be accessed by the metric/attribute collector 303 and may include one or more plugins 358 (e.g., the plugin 358 may be a driver, a listener, a publisher, or the like) that allow the metric/attribute collector 303 to communicate with one or more computing systems 104 such that resource usage can be, for example, measured. Each computing system 104 may be configured to include one or more machines 354 that are each configured to execute different operating systems 112 and/or applications 114. In other words, the plugins 358 allow the metric/attribute collector 303 to monitor resource usage across multiple different computing environments simultaneously. For example, the plugins 358 may include a LINUX plugin, a WINDOWS plugin, a MAC plugin, a SOLARIS plugin, a VMWARE plugin, a HYPER-V plugin, a CITRIX XEN plugin, an OPENSTACK plugin, an OPENSHIFT plugin, a KUBERNETES plugin, a DOCKER plugin, a PIVOTAL plugin, an AMAZON plugin, a MICROSOFT plugin, a GOOGLE plugin, a bare metal plugin (e.g., a plugin configured to communicate directly with a non-virtualized machine), and/or any other plugin that allows for the monitoring of resource usage across multiple operating systems/environments. The plugins 358 may also allow for the monitoring of one or more virtualized and/or physical environments simultaneously. The plugins 358 may also enable monitoring of other user account information including billing information, software program utilization, software licenses rented, and/or any other additional user account information.

The plugins 358 can be configured to be activated (e.g., the metric/attribute collector 303 is able to communicate with a respective computing system 104 using a respective plugin 358) or deactivated (e.g., the metric/attribute collector 303 is unable to communicate with a respective computing system 104 using a respective plugin 358).

The machine manager 342 may allow for the assigning and/or associating of machines 354 to a respective machine collection 356. The machine manager 342 may analyze the machines 354 in the machine collection(s) 356 to determine, for example, the specifications and/or the operating system of the machines 354. The specifications may include, for example, information related to the computing resources 108 (e.g., available memory, storage, and/or the like).

The machine manager 342 may also search for new machines that are to be monitored by the metric/attribute collector 303. The machine manager 342 may detect new machines by searching for new IP addresses that have been associated with a specific account 350 and/or resource consuming user 352.

The collector database manager 344 manages the data received and/or generated by the metric/attribute collector 303. For example, the collector database manager 344 may receive and/or cause to be stored one or more records (e.g., data) relating to the machine(s) 354, the machine collection(s) 356, the account(s) 350, and the resource usage associated therewith (e.g., metrics/attributes). The collector database manager 344 may also delete data. For example, the collector database manager 344 may delete records associated with a respective machine 354, a respective machine collection 356, and/or a respective account 350. In some cases, the collector database manager 344 may truncate records associated with a respective machine 354, a respective machine collection 356, and/or a respective account 350. Deletion and/or truncation may occur after, for example, a period of time has elapsed and/or after the deactivation/termination of a respective account 350.

The collector database manager 344 may communicate with a collector database 364 via a communication link 366 and cause one or more records to be stored on the collector database 364. As shown, the collector database 364 may be remote from the metric/attribute collector 303 (e.g., operating on a different server and/or a different network). However, in some cases, the collector database 364 may be local to the metric/attribute collector 303 (e.g., operating on the same server, on the same network, and/or on the same device). Data transmitted via the communication link 366 may be encrypted to prevent unauthorized access to the data during transmission. In some cases, the records stored on the collector database 364 may be encrypted to prevent unauthorized access to the records. For example, the records stored on the collector database 364 may be encrypted using transparent data encryption (TDE).

The collector synchronizer 336 may communicate with, for example, the collector database manager 344 and may copy and/or backup data received by the collector database manager 344. For example, the collector synchronizer 336 may copy one or more records stored on and/or to be stored on the collector database 364 to a collector backup 368. In some cases, the records stored on the collector backup 368 may be encrypted to prevent unauthorized access. When a change is made to one or more records, the collector synchronizer 336 may copy and/or backup only the changes to the collector backup 368. As a result, the collector synchronizer 336 may not copy an entire record to the collector backup 368. As shown, the collector synchronizer 336 may communicate with the collector backup 368 via a communication link 370. Data transmitted via the communication link 370 may be encrypted to prevent unauthorized access to the data during transmission. As shown, the collector backup 368 may be remote from the metric/attribute collector 303 (e.g., operating on a different server, in a different network, and/or on a different device). However, in some cases, the collector backup 368 may be local to the metric/attribute collector 303 (e.g., operating on the same server, on the same network, and/or on the same device).

In some cases, at least one backup collector 397 may be provided. The backup collector 397 may operate substantially the same as the metric/attribute collector 303 and may be configured to run in parallel with (or simultaneously with) the metric/attribute collector 303. In some cases, the backup collector 397 is configured to be remote from the metric/attribute collector 303 (e.g., operating on a different server, in a different network, and/or on a different device). As a result, in the event of a failure of the metric/attribute collector 303, the meter 118 may continue to monitor resource usage. In other words, the backup collector 397 may generally be described as providing redundancy. In some cases, there may be two or more backup collectors 397 such that, for example, n+2 redundancy can be achieved. Therefore, the backup collector 397 can include any one or more of the features discussed herein in relation to the metric/attribute collector 303. The backup collector 397 may communicate with the computing system 104 via a communication link 399. Data transmitted via the communication link 399 may be encrypted to prevent unauthorized access to the data during transmission.

The backup collector 397 may also be configured to generate independent records. The independent records may be used during, for example, an auditing process and/or in a data recovery process (e.g., in the event that the metric/attribute collector 303 experiences a failure). In some cases, the collector backup 368 may include the backup collector 397.

As shown, the metric/attribute collector 303 may also include the collector automator 340. The collector automator 340 may automate one or more features of the metric/attribute collector 303. For example, the collector automator 340 may be configured to receive a triggering event that causes metric/attribute collector 303 to carry out a predetermined action (e.g., commencing or terminating receiving metrics/attributes, commencing a database cleanup, enabling or disabling access to the computing resources 108, activating or deactivating one or more plugins 358, and/or any other action). A triggering event may include, for example, discovering new machine(s), expiration of a contractual term, using a predetermined quantity of resources, adding a new machine to a respective machine collection 356, and/or the like. In some cases, the trigger event may be the expiration of a period of time. For example, every one, two, three, four, or five seconds (or any other suitable time interval), the metric/attribute collector 303 may search for new Internet Protocol (IP) addresses (and/or any other identifiers) that correspond to a new machine. In these cases, the metric/attribute collector 303 may generally be described as self-updating.

As also shown, an administrator user interface 372 may be communicatively coupled to the collector core 332. The administrator user interface 372, may provide an interface for an operator of the metric/attribute collector 303 to control and/or modify the metric/attribute collector 303 and/or review data generated and/or received by the metric/attribute collector 303. For example, the administrator user interface 372 may be configured to display and/or cause to be generated usage summaries on a per account 350 or resource consuming user 352 basis. The administrator user interface 372 may also be used to, for example, manually add one or more machines 354, adjust and/or delete one or more records, add or remove new accounts 350, add or remove plugins 358, adjust/create triggers for the collector automator 340, continue and/or discontinue monitoring resource usage at predetermined times in response to, for example, the terms of a contract, and/or any other administrative task.

As shown, the administrator user interface 372 may communicate with the collector core 332 via a communication link 374. Data transmitted via the communication link 374 may be encrypted to prevent unauthorized access to the data during transmission. As shown, the administrator user interface 372 may be remote from the metric/attribute collector 303 (e.g., operating on a different server, in a different network, and/or on a different device). However, in some cases, the administrator user interface 372 may be local to the metric/attribute collector 303 (e.g., operating on the same server, on the same network, and/or on the same device).

In some cases, for example, the administrative user interface 372 may be generated and displayed on a web browser. By way of further example, in some cases, the administrative user interface 372 may be an application executing on a computer that communicates with the metric/attribute collector 303 through a network connection (e.g., the internet). By way of still further example, in some cases, the administrative user interface 372 may be an application executing locally (e.g., on the same device as the metric/attribute collector 303).

Figure 3C:
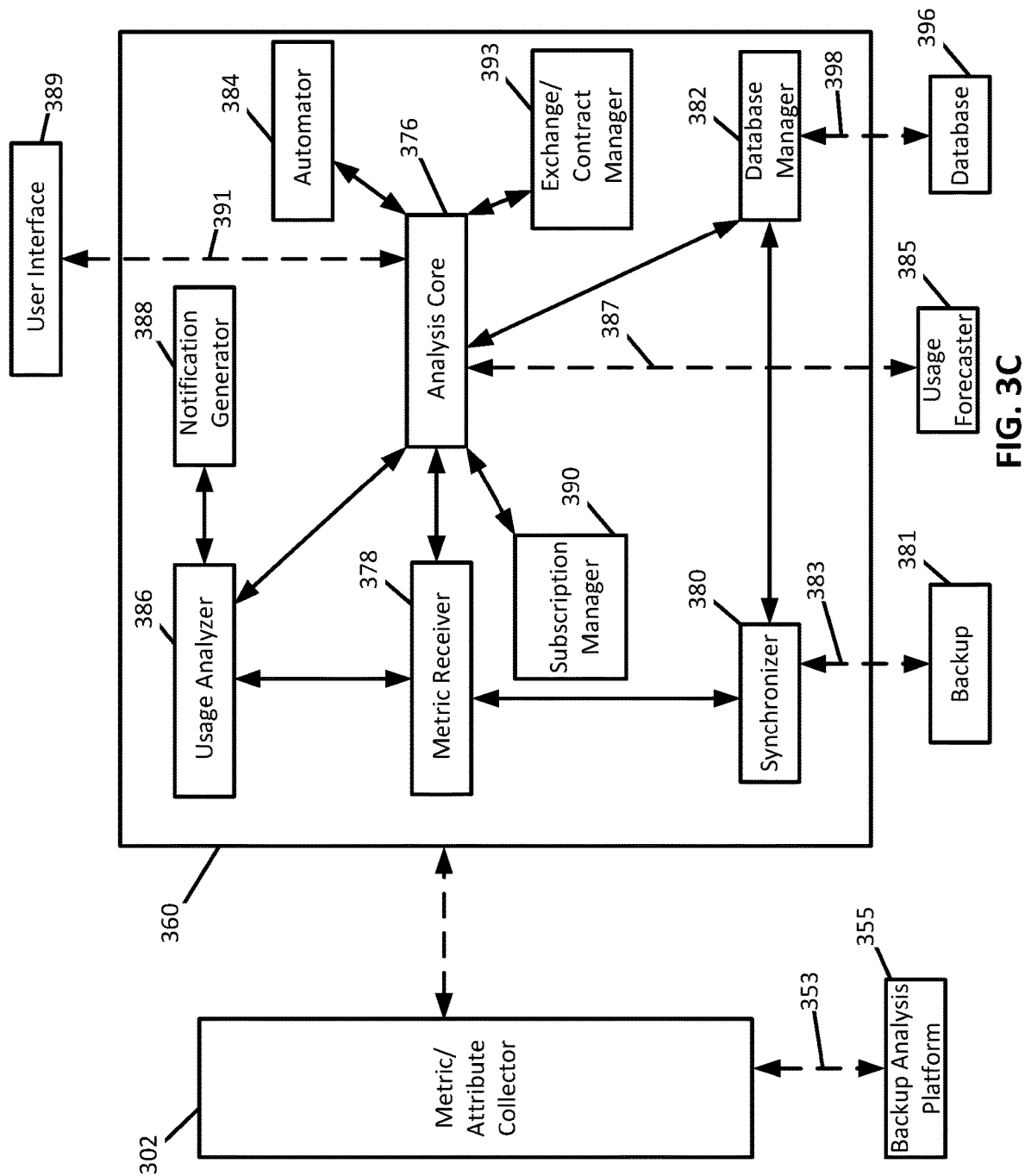
FIG. 3C shows a schematic example of an analysis platform capable of being used with the meter of FIG. 3A, consistent with embodiments of the present disclosure.

FIG. 3C shows an example of an analysis platform 360, which may be an example of the analysis platform 312 of FIG. 3A. The analysis platform 360 may generally be described as being configured to normalize (e.g., convert) a plurality of metrics/attributes that are received over a period of time to a normalized unit and sum the normalized metrics/attributes to generate a total resource usage value represented as a single normalized unit for the period of time. In other words, the analysis platform 360 may be configured to generate a single usage value that is representative of the total resource usage over a period of time. The analysis platform 360 may include any combination of hardware, software, and/or firmware. In some cases, the analysis platform 360 may be executed on the same server and/or on the same network as the metric/attribute collector 302. In other cases, the analysis platform 360 may be executed on a different server and/or a different network from the metric/attribute collector 302 (e.g., on a user's network and/or server).

The analysis platform 360 may be configured to receive one or more metrics/attributes representative of the usage of the computing resources 108 from one or more of the metric/attribute collector 302 and/or one or more backup collectors 397. In some cases, the analysis platform 360 may receive one or more metrics/attributes from the computing system 104. In these cases, the meter 118 may not include the metric/attribute collector 302 and the analysis platform 360 may include the plugin database 338. The analysis platform 360 may receive the metrics/attributes in the form of, for example, a JavaScript Object Notation (JSON) file, a Comma Separated Values (CSV) file, and/or any other file type.

The analysis platform 360 may be configured to be included with any one or more of the computing system 104, the device 102, and/or any other device communicatively coupled to the network 106. For example, the device 102 may include the analysis platform 360. When the device 102 includes the analysis platform 360, a user of the analysis platform 360 may be able to utilize the meter 118 with fewer modifications to the user's network security, when compared to when the analysis platform 360 is not executed on the device 102. In some cases, when the device 102 includes the analysis platform 360, the analysis platform 360 can be configured to analyze the resource usage of one or more users on, for example, a local network, each of the users having, for example, a respective device. Additionally, or alternatively, when the device 102 includes both the analysis platform 360 and the metric/attribute collector 302, only metrics/attributes representative of the usage of the computing resources 108 may need to be transmitted over public networks (e.g., the internet).

The analysis platform 360 may include at least one analysis core 376, at least one analysis metric receiver 378, at least one analysis synchronizer 380, at least one analysis database manager 382, at least one analysis automator 384, at least one usage analyzer 386, at least one notification generator 388, at least one subscription manager 390, and at least one exchange/contract manager 393. The analysis core 376 may generally be described as communicating with and/or managing each of the analysis metric receiver 378, the analysis synchronizer 380, the analysis database manager 382, the analysis automator 384, the usage analyzer 386, the notification generator 388, and the subscription manager 390.

As shown, the analysis core 376 is communicatively coupled to the analysis metric receiver 378. The analysis metric receiver 378 receives the metrics/attributes representative of the usage of the computing resources 108 from the metric/attribute collector 302. The analysis metric receiver 378 may include one or more of the calculators 305. In some cases, the analysis metric receiver 378 may be configured to generate a total resource usage value represented as a single normalized unit. In these cases, the analysis core 376 may be configured to receive a total resource usage value represented as a single normalized unit. In other cases, the analysis core 376 may be configured to generate a total resource usage value represented as a single normalized unit.

The analysis core 376 and/or the analysis metric receiver 378 may be in communication with the usage analyzer 386. The usage analyzer 386 monitors usage associated with a respective account 350 and/or resource consuming user 352 to develop (or determine) a normal usage, a peak usage, and/or a trough usage. In other words, the normal usage, peak usage, and/or trough usage may be based, at least in part, on received metrics/attributes corresponding to respective ones of the computing resources 108. In some cases, for example, the peak usage may represent a maximum usage over a period of time (e.g., an hour, a day, a week, a month, and/or any other suitable period of time), the trough usage may represent the minimum usage over a period of time (e.g., an hour, a day, a week, a month, and/or any other suitable period of time), and the normal usage may represent an average usage over a period of time (e.g., an hour, a day, a week, a month, and/or any other suitable period of time). In some cases, the peak usage may approximate the maximum usage over a period of time (e.g., be a usage value within 5%, 10%, or 15% of the actual maximum usage) and trough usage may approximate the minimum usage over a period of time (e.g., be a usage value within 5%, 10%, or 15% of the actual minimum usage).

The normal usage, the peak usage, and/or the trough usage may correspond to individual computing resources, to a plurality of computing resources, and/or one or more sub-resources (e.g., one or more of a graphics processor and graphics memory of the GPU 210) making up a computing resource. For example, a normal usage, a peak usage, and/or a trough usage may be generated for each of a plurality of computing resources (e.g., each of the CPU 202, memory 204, storage 206, the network interface 208, the GPU 210, and/or one or more of the other resources 209). In these cases, the normal usage, the peak usage, and/or the trough usage for each resource may be represented as a normalized unit and/or as non-normalized unit(s) (e.g., as units that correspond to the individual resources). By way of further example, a normal usage, a peak usage, and/or a trough usage may be generated that corresponds to a plurality of computing resources (e.g., two or more of the CPU 202, memory 204, storage 206, the network interface 208, the GPU 210, and/or one or more of the other resources 209). In these cases, the normal usage, the peak usage, and/or the trough usage may be represented as a single normalized unit.

In some cases, the usage analyzer 386 may be configured to generate an overall peak usage average. The overall peak usage average may generally be described as the average of two or more peak usage values corresponding to two or more respective predetermined periods of time. For example, the peak usage may be determined for each day of a week and averaged to determine an overall peak usage average for a week. Additionally, or alternatively, the usage analyzer 386 may be configured to generate an overall trough usage average. The overall trough usage average may generally be described as the average of two or more trough usage values corresponding to two or more respective predetermined periods of time. For example, the trough usage may be determined for each day of a week and averaged to determine an overall trough usage average for a week.

The overall peak usage average and/or the overall trough usage average may correspond to individual computing resources and/or to a plurality of computing resources. For example, an overall peak usage average and/or an overall trough usage average may be generated for each of a plurality of computing resources (e.g., each of the CPU 202, the memory 204, the storage 206, the network interface 208, the GPU 210, and/or one or more of the other resources 209). In these cases, the overall peak usage average and/or the overall trough usage average for each resource may be represented as a normalized unit and/or as non-normalized unit(s) (e.g., as units that correspond to the individual resources). By way of further example, an overall peak usage average and/or an overall trough usage average may be generated that corresponds to a plurality of computing resources (e.g., two or more of the CPU 202, the memory 204, the storage 206, the network interface 208, the GPU 210, and/or one or more of the other resources 209). In these cases, the overall peak usage average and/or the overall trough usage average may be represented as a single normalized unit.

A normal average usage may generally be described as an average resource usage that is calculated by taking multiple measurements of an actual resource usage over a period of time within repeating time intervals and averaging the measurements. For example, the actual resource usage may be measured at 11:00 AM every day for five days and the average usage for 11:00 AM may be calculated based on these measurements. A peak average usage may generally be described as an average resource usage that is calculated by taking multiple measurements of an actual resource usage over a period of time within repeating time intervals, selecting a portion of the measurements having the highest usages (e.g., the highest 5%, 10%, 15%, 20%, 25%, 35%, 40%, 50%, or 60% of the resource usage), and calculating the average of the selected portion. For example, the actual resource usage may be measured at 11:00 AM every day for five days and the peak average usage for 11:00 AM may be calculated based on the three highest measurements. A trough average usage may generally be described as an average resource usage that is calculated by taking multiple measurements of an actual resource usage over a period of time within repeating time intervals, selecting a portion of the measurements having the lowest usages (e.g., the lowest 5%, 10%, 15%, 20%, 25%, 35%, 40%, 50%, or 60% of the resource usage), and calculating the average of the selected portion. For example, the actual resource usage may be measured at 11:00 AM every day for five days and the trough average usage for 11:00 AM may be calculated based on the three lowest measurements.

The normal average usage, the peak average usage, and/or the trough average usage may correspond to individual computing resources and/or to a plurality of computing resources. For example, a normal average usage, a peak average usage, and/or a trough average usage may be generated for each of a plurality of computing resources (e.g., each of the CPU 202, the memory 204, the storage 206, the network interface 208, the GPU 210, and/or one or more of the other resources 209). In these cases, the normal average usage, the peak average usage, and/or the trough average usage for each resource may be represented as a normalized unit and/or as non-normalized unit(s) (e.g., as units that correspond to the individual resources). By way of further example, a normal average usage, a peak average usage, and/or a trough average usage may be generated that corresponds to a plurality of computing resources (e.g., two or more of the CPU 202, the memory 204, the storage 206, the network interface 208, the GPU 210, and/or one or more of the other resources 209). In these cases, the normal average usage, the peak average usage, and/or the trough average usage may be represented as a single normalized unit.

Figure 3D:
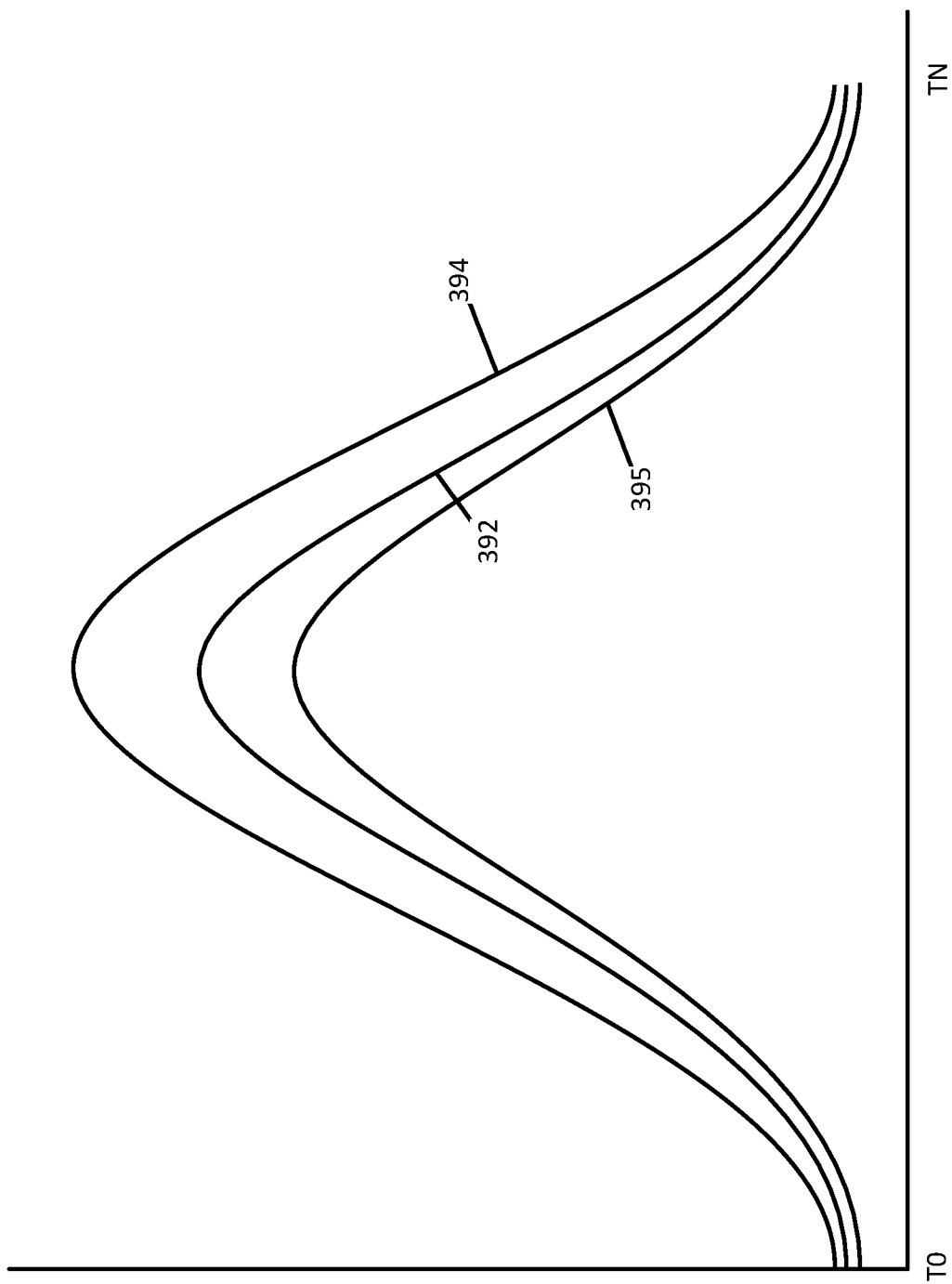
FIG. 3D shows a plot (or graph) illustrating resource usage, consistent with embodiments of the present disclosure.

The usage analyzer 386 may generate a normal average usage pattern 392, a peak average usage pattern 394, and a trough average usage pattern 395 (illustrated graphically in FIG. 3D for purposes of clarity) based on the normal average usage, the peak average usage, and the trough average usage, respectively. The normal average usage pattern 392 may be a data set comprising a plurality of normal average usage values that correspond to different predetermined times (or predetermined periods of time). The peak average usage pattern 394 may be a data set comprising a plurality of peak average usage values that correspond to different predetermined times (or predetermined periods of time). The trough average usage pattern 395 may be a data set comprising a plurality of trough average usage values that correspond to different predetermined times (or predetermined periods of time).

The data set corresponding to the normal average usage pattern 392 may be compared to the data set corresponding to the peak average usage pattern 394 to determine a threshold usage value or range for one or more predetermined times (or predetermined periods of time). For example, a threshold usage value for a predetermined time may be obtained by taking the average of the normal average usage value and the peak average usage value at a respective predetermined time. By way of further example, a threshold usage range may be described as the range extending from the normal average usage value to the peak average usage value at a respective predetermined time.

Additionally, or alternatively, the data set corresponding to the trough average usage pattern 395 may be compared to the data set corresponding to the peak average usage pattern 394 to determine a threshold usage value or range for one or more predetermined times (or predetermined periods of time). For example, a threshold usage value for a predetermined time may be obtained by taking the average of the trough average usage value and the peak average usage value at a respective predetermined time. By way of further example, a threshold usage range may be described as the range extending from the trough average usage value to the peak average usage value at a respective predetermined time.

Additionally, or alternatively, the data set corresponding to the normal average usage pattern 392 may be compared to the data set corresponding to the trough average usage pattern 395 to determine a threshold usage value or range for one or more predetermined times (or predetermined periods of time). For example, a threshold usage value for a predetermined time may be obtained by taking the average of the normal average usage value and the trough average usage value at a respective predetermined time. By way of further example, a threshold usage range may be described as the range extending from the trough average usage value to the normal average usage value at a respective predetermined time.

Additionally, or alternatively, the threshold usage value may be a trough average usage value, a peak average usage value, a trough usage value (i.e., a minimum usage over a predetermined time) or an overall trough usage average value, and/or a peak usage value (i.e., a maximum usage over a predetermined time) or an overall peak usage average value.

The notification generator 388 may be configured to cause a notification to be generated in response to, for example, one or more of resource usage at a predetermined time (or predetermined time interval) meeting, exceeding, and/or failing to exceed a threshold usage value and/or resource usage falling outside of a threshold usage range. In other words, a notification may be caused to be generated based, at least in part, on a comparison of the resource usage to a threshold or a threshold usage range. For example, detecting a usage that exceeds the threshold usage value may be indicative of an unauthorized third-party using the resources and detecting a usage that does not exceed the trough average usage value may be indicative of a hardware failure (e.g., at least a portion of the computing resources 108 may be malfunctioning).

In some cases, the usage analyzer 386 may be configured to identify outliers (e.g., resource usage that falls outside of the threshold usage range). For example, the usage analyzer 386 may utilize machine learning to identify periods of time of high and low usage. In periods of high usage and/or low usage, the usage analyzer 386 may identify usage as an outlier if the usage does not, for at least a period of time (e.g., 10 minutes, 30 minutes, 60 minutes, 2 hours, and/or any other time span), exceed the peak average usage value and/or fails to exceed the trough average usage value. As a result, the notification generator 388 may be configured to not generate a notification in response to the detection of an outlier. Further, when an outlier is identified, the usage analyzer 386 may exclude the outlier from the calculation of the normal average usage pattern 392, the peak average usage pattern 394, and/or the trough average usage pattern 395 unless, for example, the outlier is detected multiple times. Therefore, the normal average usage pattern 392, the peak average usage pattern 394, and/or the trough average usage pattern 395 may each be generally described as being generated using machine learning.

In some cases, the usage analyzer 386 may analyze the usage of other users of the meter 118 to determine if other users are experiencing similar usage patterns. For example, if multiple users are experiencing a resource usage that does not exceed the trough average resource value, it may be indicative of a hardware failure (e.g., at least a portion of the computing resources 108 may be malfunctioning). In this case, the notification generator 388 may cause a notification to be generated.

The generated notification may be in the form of an alert transmitted to an owner/user of, for example, one or more of the accounts 350 via, for example, telephone call, SMS text message, e-mail, fax, tactile sensation (e.g., via a smart watch, fitness tracker, remote health monitoring device, and/or any other wearable device), an alert generated within an application or software for managing the analysis platform 360 and/or the metric/attribute collector 302 (e.g., an in-application message), and/or any other type of alert.

The usage analyzer 386 may determine periods of high resource usage and periods of low resource usage that occur on a periodic basis over a period of time using, for example, machine learning. When the periods of high resource usage and low resource usage are identified, the threshold usage at which, for example, an alert is caused to be generated may be adjusted. For example, during a known period of high resource usage the threshold usage for generation of an alert may be adjusted to be higher than during a known period of low resource usage.

The usage analyzer 386 may also be configured to generate a benchmark (e.g., an average cost index) representative of a per unit cost of consumed resources for one or more users and/or accounts. The usage analyzer 386 may receive a total resource usage value represented as a single normalized unit associated with one or more accounts 350, resource consuming users 352, and/or machine collections 356. In some cases, the usage analyzer 386 may receive a total resource usage value that corresponds to a workload type (e.g., SPARK cluster workloads, ELASTICSEARCH workloads, data warehousing workloads, disaster recovery workloads, developer workloads, quality assurance workloads, production workloads, and/or the like), a service provider (e.g., AMAZON, MICROSOFT, GOOGLE, and/or any other service provider), a hardware provider (e.g., DELL, SUPERMICRO, HP, and/or any other hardware provider), a hardware configuration, a hypervisor (e.g., VMWARE, CITRIX, OPENSTRACK, and/or any other hypervisor), and/or a group (e.g., a business unit within an organization such as an engineering, sales, or marketing department).

The usage analyzer 386 may also receive cost data associated with the resources being consumed. The cost data may be received from the computing system 104 (e.g., the service provider), from user input, and/or any other source. The cost data may be representative of the cost of the total resource usage associated with a respective account 350, resource consuming user 352, machine collection 356, workload type, and/or group. The cost data associated with the resources being consumed may include one of more of a plurality of colocation costs, hardware costs, networking costs, cloud hosting costs, labor costs, software license costs, compliance costs, managed services costs, consultant costs, support costs, developer/operations education costs, cybersecurity costs, migration opportunity costs, and/or any other associated cost for resources being consumed. The usage analyzer 386 may then divide the cost of the total resource usage by the total resource usage value to obtain a cost per unit consumed value. The usage analyzer 386 may utilize the cost per unit consumed to generate a benchmark (e.g., an average cost index).

The cost per unit consumed value may then be compared to, for example, a market benchmark (e.g., an average per unit cost across all users of one or more meters 118), a group or industry benchmark (e.g., an average per unit cost across all users within a predetermined industry or group), a workload benchmark (e.g., an average per unit cost across all users executing predetermined workloads), a service provider benchmark (e.g., AMAZON, MICROSOFT, GOOGLE, and/or any other service provider), and/or the like. The group or industry benchmark may be based on, for example, company size (e.g., market cap, annual revenues, and/or the like), business units or departments within a specific company or across multiple companies (e.g., a sales department, an engineering department, and/or the like), and/or any other groupings.

In some cases, the usage analyzer 386 may also be configured to generate the market benchmark, the group or industry benchmark, the service provider benchmark, and/or the workload benchmark. For example, the usage analyzer 386 may be configured to access data relating to resource usage and resource costs of one or more accounts 350 that correspond to one or more different users.

In some cases, the usage analyzer 386 may be separate from the analysis platform 360. For example, the usage analyzer 386 may be configured to communicate with multiple analysis platforms 360 and/or metric/attribute collectors 302. In some cases, there may be a market usage analyzer that is remote from the analysis platform 360 and that is configured to determine average usage and average cost for specific groups or industries, specific accounts, specific workloads, and the like across multiple different users. In these cases, there may also be a local usage analyzer that is configured to determine an average usage and an average cost for a specific analysis platform 360.

In some cases, the usage analyzer 386 can also be configured to analyze the computing resources 108 being consumed to determine whether the workload 110 being executed on the computing resources 108 is utilizing the computing resources 108 efficiently. For example, the usage analyzer 386 may analyze the specifications of the computing resources 108 (e.g., processor speed and/or size, memory speed and/or size, GPU speed and/or size, storage speed and/or size, and/or the like) and compare them to the requirements of the workloads 110 such that the usage analyzer 386 can generate an optimized computing resources configuration (e.g., a best estimated configuration). In this case, the usage analyzer 386 can be configured to cause the generation of a notification to be sent to a user, wherein the notification can include a description of the optimized computing resources configuration. In some cases, the usage analyzer 386 can be configured to automatically transition the workloads 110 to the optimized computing resources configuration. By way of further example, the computing resources 108 may include a dedicated graphics processing unit, however, the applications 114 and/or the operating systems 112 executing on the computing resources 108 may not need a dedicated graphics processing unit to operate efficiently. In this case, the usage analyzer 386 can be configured to cause the generation of a notification to be sent to a user. In some cases, the usage analyzer 386 can be configured to automatically move the workload 110 to another computing system 104 that does not include a dedicated graphics processing unit. As a result, the cost per unit of computing resources consumed may be decreased.

In some cases, the usage analyzer 386 may further be configured to generate computing resource configuration recommendations based on the workloads 110 to be executed. The computing resource configuration recommendations may be associated with a cost per unit of computing resources consumed value and/or an estimated performance rating for a respective workload 110. As a result, a user may compare resource costs and/or performance between multiple resource suppliers and/or multiple computer resources options available from a particular resource supplier.

In some cases, the usage analyzer 386 may be configured to analyze a user's resource usage when the user is purchasing a predetermined quantity of resources in advance. In these cases, the usage analyzer 386 may convert the quantity of pre-purchased resources to a normalized value representative of a maximum quantity of resources available and compare the normalized value of the pre-purchased resources to the peak usage value. In other words, the usage analyzer 386 can be configured to determine if a resource supply is sufficient to meet a user's peak resource demand when the user pre-purchases a predetermined quantity of resources. Therefore, based on this comparison, the usage analyzer 386 may be configured to provide recommendations regarding a quantity of resources to pre-purchase.

The subscription manager 390 manages and maintains subscription information relating to users of the meter 118. For example, the subscriptions may determine how many resource consuming users 352 may be assigned to a respective account 350, determine how many accounts may be assigned to a respective user (e.g., a corporate entity), determine how many machines 354 that may be accessed by a respective user, determine how many machines 354 that may be assigned to a respective machine collection 356, determine how many machine collections 356 a respective user may have, associate login information with respective users, determine validity of login information (e.g., whether or not the login information has expired), and/or any other task associated with subscription management.

The exchange/contract manager 393 is configured to reconcile contracts between two parties (e.g., a buyer and a seller). The exchange/contract manager 393 may be configured to disable the meter 118 in accordance with the terms of a contract. When the meter 118 has been disabled, a user's access to the computing resources 108 may be disabled. The exchange/contract manager 393 may also be configured to audit the resource usage. The auditing of the resource usage may involve confirming that the resources indicated as being used were actually used and/or that the usage was in accordance with the contract. The auditing process may involve comparing data gathered by the metric/attribute collector 302 to data generated by a second collector (e.g., a backup collector).

The analysis automator 384 may automate one or more features of the analysis platform 360. For example, the analysis automator 384 may be configured to receive a triggering event that causes the analysis platform 360 to carry out a predetermined action. The predetermined action may include, for example, one or more of the enabling or disabling access to the computing resources 108, the activating or deactivating of at least a portion of the metric/attribute collector 302 (e.g., the metric receiver 334), activating or deactivating one or more plugins 358 (e.g., one or more plugins 358 that are configured to enable communication with the computing system 104), commencing a database cleanup, and/or any other action. A triggering event may include, for example, receiving a new contract, receiving a new subscription, a user input from the administrator user interface 372, a predetermined time (e.g., the start of a new contract/subscription and/or any other predetermined time), a recall request, and/or the like. In some cases, the triggering event may be the expiration of a period of time (e.g., the lapsing of a contractual term). For example, the analysis platform 360 may carry out a predetermined action in response to a contractual term lapsing.

As shown, the analysis database manager 382 communicates with the analysis core 376 and the analysis synchronizer 380. The analysis database manager 382 manages the data received and/or generated by the analysis platform 360. For example, the analysis database manager may manage and/or cause to be stored one or more records (e.g., data) relating to subscriptions, contracts, metrics/attributes, usage patterns (e.g., the normal average usage pattern 392, the peak average usage pattern 394, or the trough average usage pattern 395), notification thresholds, triggering events, and/or any other data received or generated by the analysis platform 360. The analysis database manager 382 may also delete and/or truncate data. For example, the analysis database manager 382 may delete and/or truncate records relating to subscriptions, contracts, metrics/attributes, usage patterns (e.g., the normal average usage pattern 392, the peak average usage pattern 394, or the trough average usage pattern 395), notification thresholds, and/or any other data received by the analysis platform 360. Deletion and/or truncation may occur after, for example, a period of time has elapsed and/or after the deactivation/termination of, for example, a subscription or contract.

The analysis database manager 382 may communicate with an analysis database 396 via a communication link 398 and cause one or more records to be stored on the analysis database 396. As shown, the analysis database 396 may be remote from the analysis platform 360 (e.g., operating on a different server, in a different network, and/or on a different device). However, in some cases, the analysis database 396 may be local to the analysis platform 360 (e.g., operating on the same server, on the same network, and/or on the same device). Data transmitted via the communication link 398 may be encrypted to prevent unauthorized access during transmission. In some cases, the records stored on the analysis database 396 may be encrypted to prevent unauthorized access to the records. For example, the records stored on the analysis database 396 may be encrypted using transparent data encryption (TDE).

The analysis synchronizer 380 may communicate with the analysis metric receiver 378 and/or the analysis database manager 382 and may copy and/or backup data received by the analysis platform 360 (e.g., the data received by the analysis database manager 382). For example, the analysis synchronizer 380 may copy and/or backup one or more of the records stored on and/or to be stored on the analysis database 396 to an analysis backup 381. In some cases, the records stored on the analysis backup 381 may be encrypted to prevent unauthorized access. When a change is made to one or more of the records, the analysis synchronizer 380 may backup only the changes to the analysis backup 381. As shown, the analysis synchronizer 380 may communicate with the analysis backup 381 via a communication link 383. Data transmitted via the communication link 383 may be encrypted to prevent unauthorized access to the data during transmission. As shown, the analysis backup 381 may be remote from the analysis platform 360 (e.g., operating on a different server, in a different network, and/or on a different device). However, in some cases, the analysis backup 381 may be local to the analysis platform 360 (e.g., operating on the same server, on the same network, and/or on the same device).

In some cases, a backup analysis platform 355 that operates substantially the same as the analysis platform 360 may be provided. As a result, independent records may be maintained. The independent records may be used, for example, in an auditing process and/or in a data recovery process (e.g., in the event that the analysis platform 360 experiences a failure). The backup analysis platform 355 may be communicatively coupled to the metric/attribute collector 302 using a communication link 353.

In some cases, the analysis backup 381 may also include a backup analysis platform that operates substantially the same as the analysis platform 360. In other words, the analysis backup 381 may include a standalone analysis platform. As a result, independent records may be maintained. The independent records may be used, for example, in an auditing process and/or in a data recovery process (e.g., in the event that the analysis platform 360 experiences a failure).

As shown, a usage forecaster 385 may be communicatively coupled to the analysis core 376 via a communication link 387. The usage forecaster 385 may estimate future usage for a respective user (e.g., that owns or controls one or more accounts 350), a respective account 350, and/or a respective resource consuming user 352. The usage forecaster 385 may use, for example, the normal average usage pattern 392, the peak average usage pattern 394, and/or the trough average usage pattern 395 to forecast a future usage. Additionally, or alternatively, the usage forecaster 385 may analyze historical resource usage utilizing machine learning to forecast a future usage. For example, the usage forecaster 385 may analyze the usage for patterns and/or surges (e.g., an increase in resource usage). Once the future usage is forecasted, the usage forecaster 385 may also estimate a forecasted economic cost that corresponds to the forecasted usage.

As shown, an analysis user interface 389 may communicate with the analysis core 376 via a communication link 391. The analysis user interface 389 may be configured to generate a display that presents information relating to the analysis platform 360 and/or the metric/attribute collector 302. For example, the analysis user interface 389 may be configured to display a usage forecast, the normal average usage pattern 392 (e.g., as a graph or plot), the peak average usage pattern 394 (e.g., as a graph or plot), the trough average usage pattern 395 (e.g., as a graph or plot), current contract terms, current subscriptions, active and/or inactive notifications/alerts, and/or any other data regarding the analysis platform 360. In some cases, the analysis user interface 389 may be configured to allow a user to modify various features of the analysis platform 360. For example, the analysis user interface 389 may be configured such that a user can change and/or cancel one or more subscriptions, change and/or cancel one or more contracts, change, add, and/or remove notification thresholds and/or analysis automator 384 triggers, and/or change any other feature of the analysis platform 360.

As shown, the analysis user interface 389 may be remote from the analysis platform 360 (e.g., operating on a different server, in a different network, and/or on a different device). However, in some cases, the analysis user interface 389 may be local to the analysis platform 360 (e.g., operating on the same server, on the same network, and/or on the same device). Data transmitted over the communication link 391 may be encrypted to prevent unauthorized access to the data.

For example, in some cases, the analysis user interface 389 may be generated and displayed on a web browser. By way of further example, in some cases, the analysis user interface 389 may be an application executing on a computer that communicates with the analysis platform 360 through a network connection (e.g., the internet). By way of still further example, in some cases, the analysis user interface 389 may be an application executing locally (e.g., on the same hardware as the analysis platform 360).

The communication links 330, 353, 362, 366, 370, 374, 383, 387, 391, 398, and/or 399 may utilize the secure sockets layer (SSL) security protocol when establishing communications. As discussed herein, the communication links 330, 353, 362, 366, 370, 374, 383, 387, 391, 398, and/or 399 may each carry encrypted data. Therefore, one or more of the communication links 330, 353, 362, 366, 370, 374, 383, 387, 391, 398, and/or 399 may generally be described as being secure communication links (e.g., the communication links 330, 353, 362, 366, 370, 374, 383, 387, 391, 398, and/or 399 use at least one of the SSL security protocol and/or the data transmitted is encrypted).

The metric/attribute collector 302 and the analysis platform 360 may be implemented in software, firmware, hardware, and/or combinations thereof. For example, the metric/attribute collector 302 and the analysis platform 360 may be implemented as software configured to be stored on one or more memories (e.g., any type of tangible, non-transitory storage medium, and may include any one or more of a magnetic recording medium (e.g., a hard disk drive), optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage media for storing electronic instructions) and executed by one or more processors (e.g., processors offered for sale by INTEL, ADVANCED MICRO DEVICES, IBM, ARM, ORACLE, and/or any other processor) to carry out one or more operations. By way of further example, the metric/attribute collector 302 and the analysis platform 360 may be implemented as circuitry (e.g., an application-specific integrated circuit). The metric/attribute collector 302 and the analysis platform 360 may be implemented on the same or different machine, server, and/or network.

Figure 4:
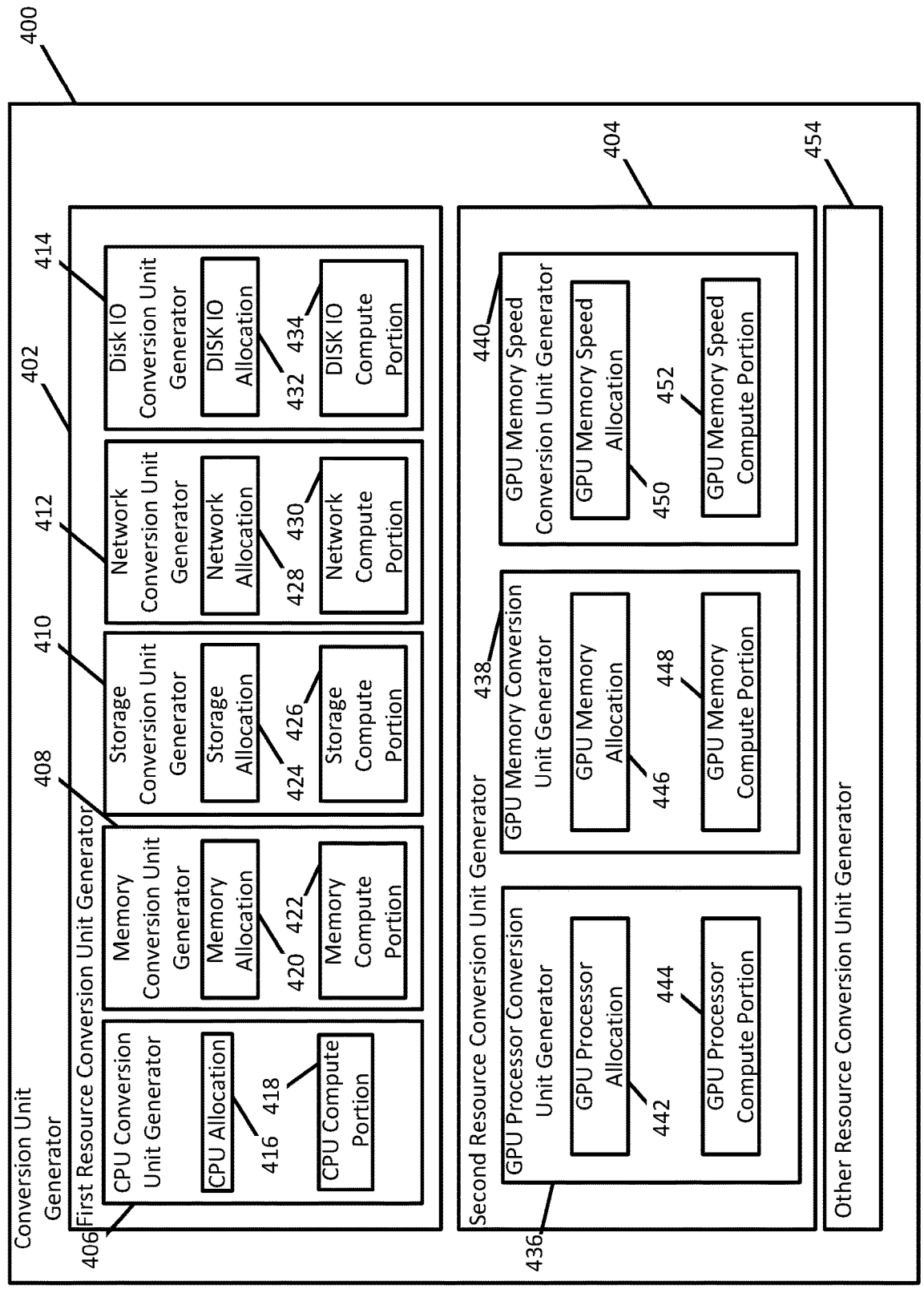
FIG. 4 shows a schematic example of a conversion unit generator, which may be used with the meter of FIG. 3, consistent with embodiments of the present disclosure.

FIG. 4 shows a schematic example of a conversion unit generator 400 configured to generate the conversion units as discussed in relation to FIG. 3A. The conversion unit generator 400 may be separate from the computing system 104, the device 102, and the network 106. For example, the conversion unit generator 400 may be part of a third-party system such that the conversion units may be generated and input into the analysis platform 312 as a fixed value. As shown, the conversion unit generator 400 may include at least a first resource conversion unit generator 402 and a second resource conversion unit generator 404. The first resource conversion unit generator 402 may generate, for example, one or more of the CPU conversion unit 314, the memory conversion unit 316, the storage conversion unit 318, the network conversion unit 320, and/or the disk IO conversion unit 328. The second resource conversion unit generator 404 may generate, for example, one or more of the GPU processor conversion unit 322, the GPU memory conversion unit 324, and/or the GPU memory speed conversion unit 326.

As shown, the first resource conversion unit generator 402 includes a CPU conversion unit generator 406, a memory conversion unit generator 408, a storage conversion unit generator 410, a network conversion unit generator 412, and a disk IO conversion unit generator 414.

The CPU conversion unit generator 406 may generate the CPU conversion unit 314 based, at least in part, on a CPU allocation 416 and a CPU compute portion 418. For example, the CPU conversion unit 314 may be generated by dividing the CPU allocation 416 by the CPU compute portion 418.

The CPU allocation 416 corresponds to the clock speed of the CPU 202 that is user accessible. For example, only a portion of the physical processor may be allocated to the workload(s) of one or more users. In other words, the usable clock speed allocated may measure less than default clock speed of the physical processor. The CPU compute portion 418 may generally correspond to a weight that is representative of CPU resources used by one or more of the workloads 110. In some cases, the CPU compute portion 418 may be an experimentally derived value that is based on an analysis of the workloads of several users. As such, in some cases, the CPU compute portion 418 may generally be described as being a dynamic weight that is adjustable at predetermined times to account for changes in workloads.

The memory conversion unit generator 408 may generate the memory conversion unit 316 based, at least in part, on a memory allocation 420 and a memory compute portion 422. For example, the memory conversion unit 316 may be generated by dividing the memory allocation 420 by the memory compute portion 422.

The memory allocation 420 corresponds to the quantity of the memory 204 that is user accessible. For example, only a portion of the physical memory may be allocated to the workload(s) of one or more users. In other words, the memory allocated may measure less than the total physical memory available. The memory compute portion 422 may generally correspond to a weight that is representative of memory resources used by one or more of the workloads 110. In some cases, the memory compute portion 422 may be an experimentally derived value that is based on an analysis of the workloads of several users. As such, in some cases, the memory compute portion 422 may generally be described as being a dynamic weight that is adjustable at predetermined times to account for changes in workloads.

The storage conversion unit generator 410 may generate the storage conversion unit 318 based, at least in part, on a storage allocation 424 and a storage compute portion 426. For example, the storage conversion unit 318 may be generated by dividing the storage allocation 424 by the storage compute portion 426.

The storage allocation 424 corresponds to the quantity of the storage 206 that is user accessible. For example, only a portion of the physical storage may be allocated to the workload(s) of one or more users. In other words, the storage allocated may measure less than the total physical storage available. The storage compute portion 426 may generally correspond to a weight that is representative of storage resources used by one or more of the workloads 110. In some cases, the storage compute portion 426 may be an experimentally derived value that is based on an analysis of the workloads of several users. As such, in some cases, the storage compute portion 426 may generally be described as being a dynamic weight that is adjustable at predetermined times to account for changes in workloads.

The network conversion unit generator 412 may generate the network conversion unit 320 based, at least in part, on a network allocation 428 and a network compute portion 430. For example, the network conversion unit 320 may be generated by dividing the network allocation 428 by the network compute portion 430.

The network allocation 428 corresponds to the network bandwidth that is user accessible. For example, only a portion of the total physical network bandwidth may be allocated to the workload(s) of one or more users. In other words, the network bandwidth allocated may measure less than the total physical network bandwidth available. The network compute portion 430 may generally correspond to a weight that is representative of network resources (e.g., bandwidth) used by one or more of the workloads 110. In some cases, the network compute portion 430 may be an experimentally derived value that is based on an analysis of the workloads of several users. As such, in some cases, the network compute portion 430 may generally be described as being a dynamic weight that is adjustable at predetermined times to account for changes in workloads.

The disk IO conversion unit generator 414 may generate the disk IO conversion unit 328 based, at least in part, on a disk IO allocation 432 and a disk IO compute portion 434. For example, the disk IO conversion unit 328 may be generated by dividing the disk IO allocation 432 by the disk IO compute portion 434.

The disk IO allocation 432 corresponds to the disk bandwidth (e.g., reads and writes to the storage 206) that is user accessible. For example, only a portion of the total physical disk bandwidth may be allocated to the workload(s) of one or more users. In other words, the disk bandwidth allocated may measure less than the total physical disk bandwidth available. The disk IO compute portion 434 may generally correspond to a weight that is representative of disk IO resources (e.g., disk bandwidth) used by one or more of the workloads 110. In some cases, the disk compute portion 434 may be an experimentally derived value that is based on an analysis of the workloads of several users. As such, in some cases, the disk compute portion 434 may generally be described as being a dynamic weight that is adjustable at predetermined times to account for changes in workloads.

The sum of the CPU compute portion 418, the memory compute portion 422, the storage compute portion 426, the network compute portion 430, and the disk IO compute portion 434 may add up to 100. In other words, each compute portion may be represented as a percentage of the total computing resources evaluated by the first resource conversion unit generator 402 by dividing the compute portion by 100.

As shown, the second resource conversion unit generator 404 includes a GPU processor conversion unit generator 436, a GPU memory conversion unit generator 438, and a GPU memory speed conversion unit generator 440.

The GPU processor conversion unit generator 436 may generate the GPU processor conversion unit 322 based, at least in part, on a GPU processor allocation 442 and a GPU processor compute portion 444. For example, the GPU processor conversion unit 322 may be generated by dividing the GPU processor allocation 442 by the GPU processor compute portion 444.

The GPU processor allocation 442 corresponds to the clock speed of the GPU 210 that is user accessible. For example, only a portion of the physical GPU processor may be allocated to the workload(s) of one or more users. In other words, the usable clock speed of the GPU processor that is allocated may measure less than the default clock speed of the physical GPU processor. The GPU processor compute portion 444 may generally correspond to a weight that is representative of GPU processor resources used by one or more of the workloads 110. In some cases, the GPU compute portion 444 may be an experimentally derived value that is based on an analysis of the workloads of several users. As such, in some cases, the GPU compute portion 444 may generally be described as being a dynamic weight that is adjustable at predetermined times to account for changes in workloads.

The GPU memory conversion unit generator 438 may generate the GPU memory conversion unit 324 based, at least in part, on a GPU memory allocation 446 and a GPU memory compute portion 448. For example, the GPU memory conversion unit 324 may be generated by dividing the GPU memory allocation 446 by the GPU memory compute portion 448.

The GPU memory allocation 446 corresponds to the quantity of the memory of the GPU 210 that is user accessible. For example, only a portion of the physical memory of the GPU 210 may be allocated to the workload(s) of one or more users. In other words, the memory of the GPU 210 that is allocated may measure less than the total physical memory of the GPU 210 that is available. The GPU memory compute portion 448 may generally correspond to a weight that is representative of memory resources used by one or more of the workloads 110. In some cases, the GPU memory compute portion 448 may be an experimentally derived value that is based on an analysis of the workloads of several users. As such, in some cases, the GPU memory compute portion 448 may generally be described as being a dynamic weight that is adjustable at predetermined times to account for changes in workloads.

The GPU memory speed conversion unit generator 440 may generate the GPU memory speed conversion unit 326 based, at least in part, on a GPU memory speed allocation 450 and a GPU memory speed compute portion 452. For example, the GPU memory speed conversion unit 326 may be generated by dividing the GPU memory speed allocation 450 by the GPU memory speed compute portion 452.

The GPU memory speed allocation 450 corresponds to the clock speed of the GPU memory that is user accessible. For example, only a portion of the clock speed of the physical GPU memory may be allocated to the workload(s) of one or more users. In other words, the usable clock speed of the GPU memory that is allocated may measure less than the default clock speed of the physical GPU memory. The GPU memory speed compute portion 452 may generally correspond to a weight that is representative of GPU memory speed resources used by one or more of the workloads 110. In some cases, the GPU memory compute portion 452 may be an experimentally derived value that is based on an analysis of the workloads of several users. As such, in some cases, the GPU memory speed compute portion 452 may generally be described as being a dynamic weight that is adjustable at predetermined times to account for changes in workloads The sum of the GPU processor compute portion 444, the GPU memory compute portion 448, and the GPU memory speed compute portion 452 may add up to 100. In other words, each compute portion may be represented as a percentage of the total computing resources evaluated by the second resource conversion unit generator 404 by dividing the compute portion by 100.

As previously discussed, the physical computing resources 108 may additionally, or alternatively, include the other resources 209. As discussed, the other resources 209 may include any one or more of a Field Programmable Gate Array (FPGA), a Tensor Processing Unit (TPU), an Intelligence Processing Unit (IPU), a Neural Processing Unit (NPU), a Vision Processing Unit (VPU), a Digital Signal Processor (DSP), an Accelerated Processing Unit (APU), an Application-Specific Integrated Circuit (ASIC), a System-on-Chip (SoC), a programmable SoC, an Application Specific Standard Parts (ASSP), an Adaptive Compute Acceleration Platform (ACAP), a microcontroller, and/or any other computing resource. In these cases, the resource conversion units may each be determined using an independent resource conversion unit generator that corresponds to a respective one of the other computing resources 209. For example, the conversion unit generator 400 can include an other resource conversion unit generator 454. The other resource conversion unit generator 454 can be configured to generate one or more conversion units that correspond to a respective one or more of the other resources 209.

Figure 5:
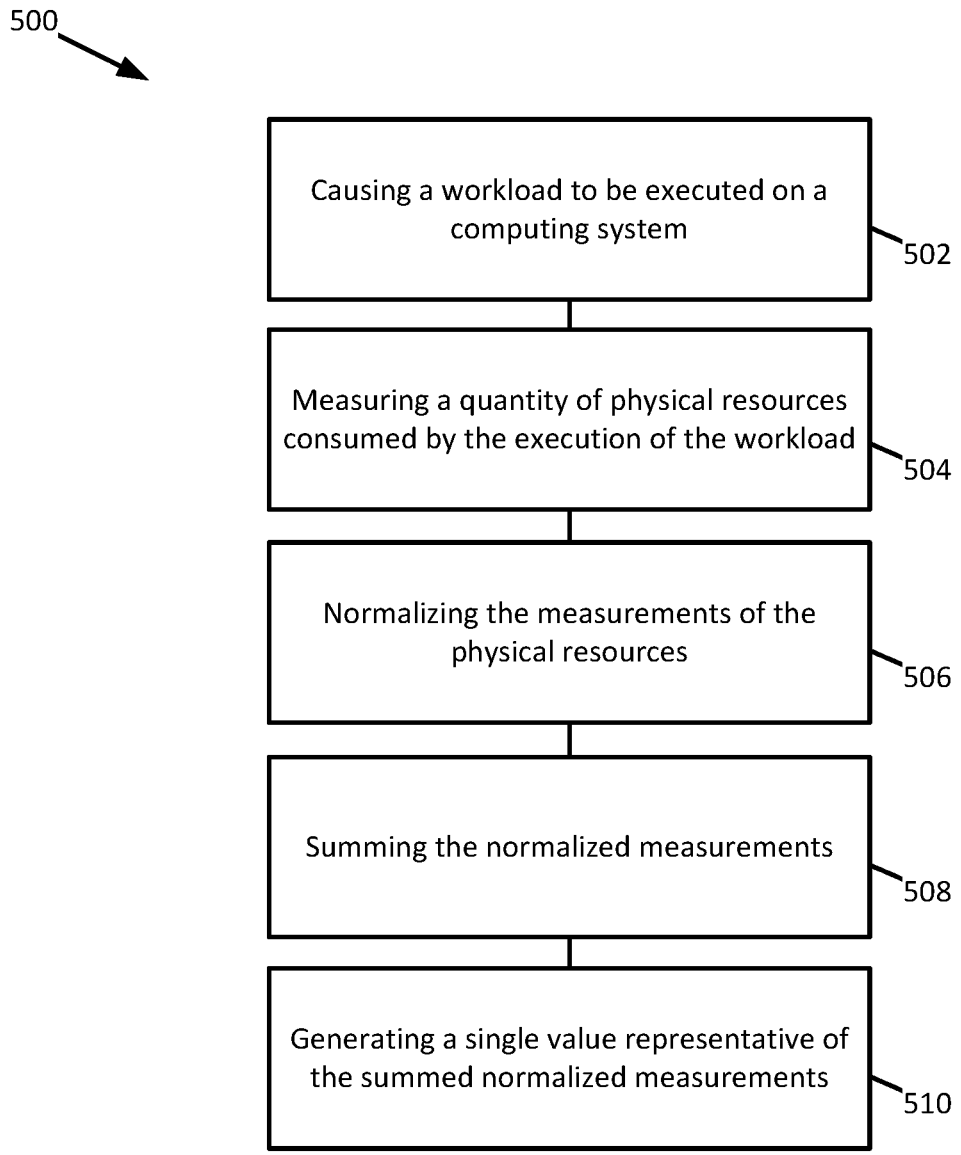
FIG. 5 shows an example flow chart of a method of quantifying usage of disparate computing resources as a single unit of measure, consistent with embodiments of the present disclosure.

FIG. 5 shows an example flow chart of a method 500 for quantifying usage of disparate computing resources as a single unit of measure, which may, for example, be used in the system of FIG. 1. The method 500 may be embodied as one or more instructions in one or more non-transitory computer readable mediums (e.g., the storage 206) that are configured to be executed by one or more processors (e.g., the CPU 202).

As shown, the method 500 may include step 502. Step 502 may include causing a workload (e.g., the workload 110) to be executed on a computing system (e.g., the computing system 104). In some cases, the workload may be caused to be executed, for example, in response to receiving a request from the device 102. Additionally, or alternatively, the workload may include one or more idle processes caused by operation of the computing system.

The method 500 may also include a step 504. The step 504 may include measuring a quantity of physical resources used (e.g., consumed) by the execution of the workload over a period of time (e.g., 1 second, 10 seconds, 1 minute, 1 hour, 1 day, 1 week, 1 month, 1 year, and/or any other suitable period of time). The physical quantity of resources may be measured (as opposed to, for example, virtual resources) to prevent or otherwise mitigate inaccurate readings used by the ballooning technique which may be employed by hypervisors measuring virtual resource usage. Further, by measuring the physical resources directly, it may be possible to implement the method on multiple forms of hardware, including hardware not running a virtual machine. Therefore, it is possible to implement this method in systems utilizing packaged software (e.g., containers).

The method 500 may include a step 506. The step 506 may include normalizing the measurements of the physical resources used. Normalizing the measurements may include converting each of the disparate resources (e.g., CPU resources, memory resources, storage resources, network interface resources, GPU resources, and/or any other computing resource) to a common unit (e.g., as described in relation to FIGS. 3 and 4).

The method 500 may include a step 508. The step 508 may include summing the normalized measurements. The method 500 may also include a step 510. The step 510 may include generating a single value representative of the summed normalized resources used. For example, the generated single value may be the summed result. In other cases, the generated value may represent an average of summed normalized resources over a time window (e.g., a weekly average in which the individual summed normalized values correspond to days of the week).

Figure 6:
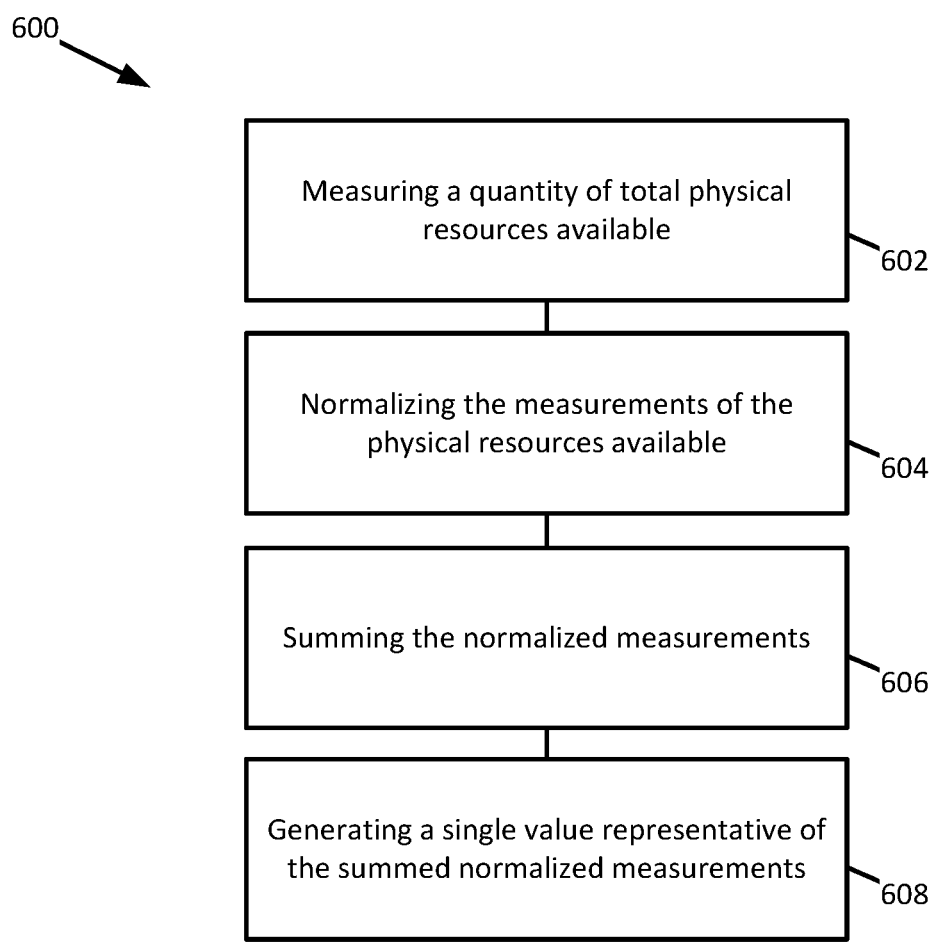
FIG. 6 shows an example flow chart of a method of quantifying a total of disparate computing resources available (e.g., both used and inactive resources) as a single unit of measure, consistent with embodiments of the present disclosure.

FIG. 6 shows an example flow chart of a method 600 for quantifying a maximum or minimum value of disparate computing resources as a single unit of measure, which may, for example, be used in the system of FIG. 1. The method may be embodied as one or more instructions in one or more non-transitory computer readable mediums (e.g., the storage 206) that are configured to be executed by one or more processors (e.g., the CPU 202).

The method may include a step 602. The step 602 may include measuring, over a period of time, a maximum quantity of physical resources available and/or measuring, over a period of time, a minimum quantity of physical resources for running idle processes (e.g., idle processes 113).

The method may include a step 604. The step 604 may include normalizing the measurements of disparate physical resources available (e.g., both used and inactive resources). Normalizing the measurements may include converting each of the disparate resources (e.g., CPU resources, memory resources, storage resources, network interface resources, GPU resources, and/or any other computing resource) to a common unit (e.g., as described in relation to FIGS. 3A-C and 4).

The method may also include a step 606. The step 606 may include summing the normalized measurements of physical resources available. The method may include a step 608. The step 608 may include generating a single value representative of the summed normalized resources available. For example, the generated single value may be the summed result. By way of further example, the generated single value may be an adjusted value that is based on the summed result.

In some cases, a maximum and/or minimum quantity of physical computing resources available over a period of time may be calculated based, at least in part, on the specifications corresponding to individual physical computing resources. This may allow a user to estimate the maximum and/or minimum quantity of physical computing resources available without having access to the physical computing resources. In some cases, the calculated value may be compared to the measured value in the method 600. For example, the calculated value may be compared to the measured value to adjust the specifications that correspond to the individual computing resources and/or the calculation method such that the estimation of the maximum and/or minimum quantity of physical computing resources available may be improved.

According to one aspect of the present disclosure, there is provided a computing network. The computing network may include physical computing resources configured to execute at least one workload. The computing network may also include a meter configured to measure a quantity of the physical computing resources being used over a period of time. The meter may generate a single usage value that is representative of the quantity of physical resources used over the period of time.

According to another aspect of the present disclosure, there is provided at least one computer readable storage medium having instructions stored thereon, which, when executed by one or more processors, cause the one or more processors to carry out one or more operations. The one or more operations may include measuring a quantity of one or more physical computing resources being used over a period of time. The one or more operations may also include normalizing each measured quantity of each physical computing resource being used. The one or more operations may further include summing the normalized measured quantities of the physical computing resources being used. The one or more operations may also include generating a single usage value representative of the physical computing resources being used over the period of time based on the summed normalized physical computing resources.

According to yet another aspect of the present disclosure, there is provided a method. The method may include measuring a quantity of one or more physical computing resources being used over a period of time. The method may also include normalizing each measured quantity of each physical computing resource being used. The method may further include summing the normalized measured quantities of the physical computing resources being used. The method may also include generating a single usage value representative of the physical computing resources being used over the period of time based on the summed normalized physical computing resources.

According to yet another aspect of the present disclosure, there is provided a computing network. The computing network may include a computing system configured to be communicatively coupled to a device. The computing system may be configured to execute at least one workload. The computing system may include physical computing resources configured to execute the at least one workload. The computing system may also include a meter configured to measure a quantity of the physical computing resources being used over a period of time. The meter may generate a single usage value that is representative of the quantity of physical resources used over the period of time.

According to yet another aspect of the present disclosure, there is provided a system for metering disparate computer resources. The meter may include at least one collector. The collector may include at least one metric receiver configured to receive one or more metrics from at least one computing system over a period of time, wherein the metrics correspond to physical resource usage. The meter may also include at least one analysis platform configured to normalize each of the received metrics and sum the normalized metrics to generate a single usage value representative of the physical resource usage over the period of time.

According to yet another aspect of the present disclosure, there is provided, a computing network. The computing network may include a computing system having a plurality of physical computing resources configured to execute one or more workloads and a meter communicatively coupled to the computing system. The meter may be configured to measure a quantity of the physical computing resources being used over a period of time. The meter may include at least one collector that includes at least one metric receiver configured to receive one or more metrics from the computing system, wherein the metrics correspond to the quantity of the physical resources used. The meter may also include at least one analysis platform in communication with the collector and configured to normalize each of the received metrics and sum the normalized metrics to generate a single usage value representative of the physical resource usage over the period of time.

According to yet another aspect of the present disclosure, there is provided a computing network. The computing network may include a computing system configured to be communicatively coupled to a device. The computing system may be configured to execute at least one workload. The computing system may include physical computing resources configured to execute the at least one workload. The computing system may be configured to communicate with a meter. The meter may be configured to measure a quantity of the physical computing resources being used, wherein the meter is further configured to generate a single usage value that is representative of the quantity of physical resources used.

According to yet another aspect of the present disclosure, there is provided a computing network. The computing network may include a computing system having a plurality of physical computing resources configured to execute one or more workloads. The computing network may also include at least one metric collector having at least one metric receiver that is configured to receive one or more metrics from the computing system, wherein the one or more metrics correspond to a usage of the physical computing resources. The computing network may further include at least one backup collector having a backup receiver that is configured to receive the one or more metrics from the computing system. The computing network may also include at least one analysis platform in communication with at least one of the metric collector or backup collector, wherein the analysis platform may be configured to normalize each of the received metrics and sum the normalized metrics to generate a single usage value.

According to yet another aspect of the present disclosure, there is provided a system for metering disparate computer resources. The system may include at least one collector that includes at least one metric receiver and an account manager. The metric receiver may be configured to receive one or more metrics from at least one computing system, wherein the metrics correspond to physical resource usage. The account manager may be configured to manage a plurality of accounts. Each of the plurality of accounts may be associated with at least one resource consuming user, wherein the physical resource usage of each resource consuming user is associated with a respective account. The system may also include a usage analyzer configured to generate a benchmark for one or more accounts that is representative of a per unit cost of the physical resource usage.

According to yet another aspect of the present disclosure, there is provided a computing network. The computing network may include a computing system configured to be communicatively coupled to a device. The computing system may also be configured to execute at least one workload. The computing system may include physical computing resources configured to execute the at least one workload. The computing network may also include a meter that is configured to measure a quantity of the physical computing resources being used over a period of time and generate a single usage value that is representative of the quantity of physical resources used over the period of time. The meter may be further configured to selectively disable access, by the device, to at least a portion of the computing system.

According to yet another aspect of the present disclosure there is provided a method. The method may include measuring a quantity of a plurality of physical computing resources being used over a period of time. The method may also include normalizing each measured quantity of each physical computing resource being used. The method may also include summing the normalized measured quantities of the physical computing resources being used to generate a single usage value representative of the physical computing resources being used over the period of time.

In some cases, the plurality of physical computing resources may include a plurality of disparate physical computing resources. In some cases, the plurality of physical computing resources may include one or more of a graphics processing system, a field programmable gate array, an application-specific integrated circuit, a system on chip, a digital signal processor, a microcontroller, or an adaptive compute acceleration platform. In some cases, the plurality of physical computing resources may include the graphics processing system and the graphics processing system may include a graphics processor and graphics memory. In some cases, the method may further include measuring a maximum quantity of a plurality of physical computing resources available over the period of time, normalizing each measured maximum quantity of each available physical computing resource, and summing the normalized measured maximum quantities of the available physical computing resources to generate a single available resource value representative of the maximum quantity of available physical computing resources over the period of time.

According to yet another aspect of the present disclosure there is provided a computing network. The computing network may include one or more computing systems having a plurality of physical computing resources configured to execute one or more workloads. The computing network may also include one or more metric collectors, each metric collector having at least one metric receiver that is configured to receive a plurality of metrics from the one or more computing systems. The plurality of metrics may correspond to a usage of the physical computing resources. The computing network may also include one or more analysis platforms configured to normalize each of the received metrics.

In some cases, the one or more analysis platforms can be further configured to sum the normalized metrics to generate a single usage value. In some cases, at least a portion of the physical computing resource usage may be associated with one or more accounts. In some cases, the one or more accounts may include a plurality of accounts and at least one account may be associated with a portion of the physical computing resource usage and at least one other account may be associated with a different portion of the physical computing resource usage. In some cases, at least one of the metric collectors may further include a plugin database having one or more plugins, wherein the one or more plugins can be configured to enable at least one of the metric collectors to communicate with one or more computing systems. In some cases, the analysis platform can be configured to generate a notification based, at least in part, on a comparison of the physical computing resource usage to a threshold. In some cases, the one or more analysis platforms can include a plurality of analysis platforms and at least one of the analysis platforms can be a backup analysis platform. In some cases, the one or more analysis platforms can be configured to activate or deactivate at least one of the metric collectors at a predetermined time. In some cases, at least one of the metric collectors may include at least one of the one or more analysis platforms. In some cases, the one or more metric collectors may include a plurality of metric collectors and at least one of the plurality of metric collectors may be a backup metric collector. In some cases, the analysis platform may be further configured to determine one or more of a peak usage (e.g., a maximum usage), a trough usage (e.g., a minimum usage), or an average usage corresponding to each physical computing resource over the period of time based, at least in part, on the received metrics.

According to yet another aspect of the present disclosure there is provided at least one computer readable storage medium having one or more instructions stored thereon, which, when executed by one or more processors, cause one or more operations to be carried out. The operations may include measuring a quantity of a plurality of physical computing resources being used over a period of time. The operations may also include normalizing each measured quantity of each physical computing resource being used. The operations may also include summing the normalized measured quantities of the physical computing resources being used to generate a single usage value representative of the physical computing resources being used over the period of time.

In some cases, the plurality of physical computing resources may include a plurality of disparate physical computing resources. In some cases, the plurality of physical computing resources may include one or more of a graphics processing system, a field programmable gate array, an application-specific integrated circuit, a system on chip, a digital signal processor, a microcontroller, or an adaptive compute acceleration platform. In some cases, the plurality of physical computing resources may include the graphics processing system and the graphics processing system may include a graphics processor and graphics memory. In some cases, the operations may further include measuring a maximum quantity of a plurality of physical computing resources available over the period of time, normalizing each measured maximum quantity of each available physical computing resource, and summing the normalized measured maximum quantities of the available physical computing resources to generate a single available resource value representative of the maximum quantity of available physical computing resources over the period of time. In some cases, the operations may also include accessing a plugin database, wherein the plugin database may include one or more plugins configured to enable measuring of the plurality of physical computing resources. In some cases, the operations may further include determining one or more of a peak usage (e.g., a maximum usage), a trough usage (e.g., a minimum usage), or an average usage corresponding to each physical computing resource over the period of time.

In yet another aspect of the present disclosure there is provided a method. The method may include measuring a quantity of graphics processing system resources being used over a period of time, wherein the graphics processing system resources may include a graphics processor and graphics memory. The method may also include normalizing the measured quantities corresponding to the graphics processor and graphics memory. The method may also include summing the normalized measured quantities to generate a single usage value representative of the graphics processing system resources being used over the period of time.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used.

Those skilled in the art will recognize, or be able to ascertain using no more than routine experimentation, many equivalents to the specific embodiments of the disclosure described herein. It is, therefore, to be understood that the foregoing embodiments are presented by way of example only and that, within the scope of the appended claims and equivalents thereto, the disclosure may be practiced otherwise than as specifically described and claimed. The present disclosure is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The indefinite articles "a" and "an," as used herein in the specification and in the claims, unless clearly indicated to the contrary, should be understood to mean "at least one."

The terms "couple" and "coupled," as used herein, encompass both direct and indirect coupling unless clearly indicated to the contrary.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A method comprising:
   receiving one or more resource attributes for each of a plurality of physical computing resources, the plurality of physical computing resources including at least one graphics processing system, the graphics processing system having as resource attributes (i) a graphics processor variable clock speed and (ii) a variable graphics memory clock speed;
   receiving a resource compute portion and a resource allocation for each of the plurality of physical computing resources over a period of time;
   determining a single usage value for the plurality of physical computing resources over the period of time by:
      calculating, using one or more processors, a utilization for each of the plurality of physical computing resources based at least on the one or more resource attributes of each respective physical computing resource of the plurality of physical computing resources;
      generating, for each respective physical computing resource of the plurality of physical computing resources and based at least on the resource allocation and the resource compute portion of each respective physical computing resource, a conversion unit;
      normalizing, for each respective physical computing resource of the plurality of physical computing resources and using at least a conversion unit associated with the respective physical computing resource, the utilization associated with the respective physical computing resource; and
      summing the normalized utilizations for each of the plurality of physical computing resources to generate the single usage value representative of the plurality of physical computing resources over the period of time.

2. The method of claim 1, wherein the plurality of physical computing resources includes a plurality of disparate physical computing resources.

3. The method of claim 1, wherein the plurality of physical computing resources further comprises one or more of a field programmable gate array, an application-specific integrated circuit, a system on chip, a digital signal processor, a microcontroller, or an adaptive compute acceleration platform.

4. The method of claim 1, wherein normalizing the utilization for each respective physical computing resource further comprises dividing the utilization for a respective physical computing resource by a conversion unit associated with that respective physical computing resource, the conversion unit being resource allocation divided by resource compute portion for that respective physical computing resource.

5. The method of claim 1, further comprising:
   determining, for each available physical computing resource of the plurality of physical computing resources, one or more available resource attributes;
   determining a single available resource value representative of a maximum of available resources in the plurality of physical computing resources over the period of time;
      calculating, using the one or more processors, an availability utilization for each available physical computing resource of the plurality of physical computing resources based at least on the one or more available resource attributes;
      normalizing, for each respective available physical computing resource and using at least the conversion unit associated with the respective available physical computing resource, the availability utilization associated with the respective available physical computing resource; and
   summing the normalized availability utilization for each of the available physical computing resources to generate the single available resource value.

6. At least one computer readable storage medium having one or more instructions stored thereon, which, when executed by one or more processors, cause one or more operations to be carried out, the operations comprising:
   receiving one or more resource attributes for each of a plurality of physical computing resources, the plurality of physical computing resources including at least one graphics processing system, the graphics processing system having as resource attributes (i) a graphics processor variable clock speed and (ii) a variable graphics memory clock speed;
   receiving a resource compute portion and a resource allocation for each of the plurality of physical computing resources over a period of time;
   determining a single usage value for the plurality of physical computing resources over the period of time by:
      calculating, using the one or more processors, a utilization for each of the plurality of physical computing resources based at least on the one or more resource attributes of each respective physical computing resource of the plurality of physical computing resources;
      generating, for each respective physical computing resource of the plurality of physical computing resources and based at least on the resource allocation and the resource compute portion of each respective physical computing resource, a conversion unit;
      normalizing, for each respective physical computing resource of the plurality of physical computing resources and using at least a conversion unit associated with the respective physical computing resource, the utilization associated with the respective physical computing resource; and
      summing the normalized utilization for each of the plurality of physical computing resources to generate the single usage value representative of the plurality of physical computing resources over the period of time.

7. The computer readable storage medium of claim 6, wherein the plurality of physical computing resources includes a plurality of disparate physical computing resources.

8. The computer readable storage medium of claim 6, wherein the plurality of physical computing resources further comprises: one or more of a field programmable gate array, an application-specific integrated circuit, a system on chip, a digital signal processor, a microcontroller, or an adaptive compute acceleration platform.

9. The computer readable storage medium of claim 6, wherein normalizing the utilization for each respective physical computing resource further comprises dividing the utilization for a respective physical computing resource by a conversion unit associated with that respective physical computing resource, the conversion unit being resource allocation divided by resource compute portion for that respective physical computing resource.

10. The computer readable storage medium of claim 6, wherein the operations further comprise:
   determining, for each available physical computing resource of the plurality of physical computing resources, one or more available resource attributes;
   determining a single available resource value representative of a maximum of available resources in the plurality of physical computing resources over the period of time:
   calculating, using the one or more processors, an availability utilization for each available physical computing resource of the plurality of physical computing resources based at least on the one or more available resource attributes;
   normalizing, for each respective available physical computing resource and using at least the conversion unit associated with the respective available physical computing resource, the availability utilization associated with the respective available physical computing resource; and
   summing the normalized of availability utilization for each the available physical computing resources to generate the single available resource value.

11. The computer readable storage medium of claim 6, wherein the resource compute portion and the resource allocation for at least one of the plurality of physical computing resources is received via one or more plugins.

12. The computer readable storage medium of claim 6, wherein the operations further comprise determining one or more of a peak usage, a trough usage, or an average usage corresponding to each physical computing resource over the period of time.

* * * * *